(12) United States Patent
Zorgui et al.

(10) Patent No.: US 11,696,328 B2
(45) Date of Patent: Jul. 4, 2023

(54) SIDELINK-AIDED RADIO FREQUENCY SENSING

(71) Applicant: QUALCOMM Incorporated, San Diego, CA (US)

(72) Inventors: Marwen Zorgui, San Diego, CA (US); Srinivas Yerramalli, Hyderabad (IN); Roohollah Amiri, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/357,570

(22) Filed: Jun. 24, 2021

(65) Prior Publication Data

US 2022/0417987 A1 Dec. 29, 2022

(51) Int. Cl.
*H04W 74/08* (2009.01)
*H04W 72/0453* (2023.01)
*H04W 24/10* (2009.01)
*H04W 72/20* (2023.01)

(52) U.S. Cl.
CPC ....... *H04W 74/0808* (2013.01); *H04W 24/10* (2013.01); *H04W 72/0453* (2013.01); *H04W 72/20* (2023.01)

(58) Field of Classification Search
CPC .................................................. H04W 24/10
See application file for complete search history.

(56) References Cited

U.S. PATENT DOCUMENTS

| | | | | |
|---|---|---|---|---|
| 2020/0022089 | A1* | 1/2020 | Guo ..................... | H04W 52/242 |
| 2021/0223376 | A1* | 7/2021 | Luo ........................ | G01S 13/003 |
| 2021/0289476 | A1* | 9/2021 | Ryu ...................... | H04W 16/28 |
| 2022/0155435 | A1* | 5/2022 | Bayesteh .............. | H04W 24/10 |
| 2022/0393741 | A1* | 12/2022 | Xia ....................... | H04B 7/0639 |

* cited by examiner

*Primary Examiner* — Zhiren Qin
(74) *Attorney, Agent, or Firm* — Arent Fox LLP/Qualcomm Incorporated

(57) ABSTRACT

Example aspects include a method, apparatus, and computer-readable medium for sidelink-aided radio frequency (RF) sensing at user equipment (UE) of a wireless communication network, comprising receiving a sensing establishment message associated with a sensing session. The aspects further include receiving one or more sensing measurement information obtained by the one or more sidelink UEs corresponding to the sensing session, or a first sensing outcome information corresponding to the sensing session obtained by one of the one or more sidelink UEs based on the one or more sensing measurement information. Additionally, the aspects include transmitting the one or more sensing measurement information obtained by the one or more sidelink UEs corresponding to the sensing session, or a second sensing outcome information corresponding to the sensing session.

30 Claims, 10 Drawing Sheets

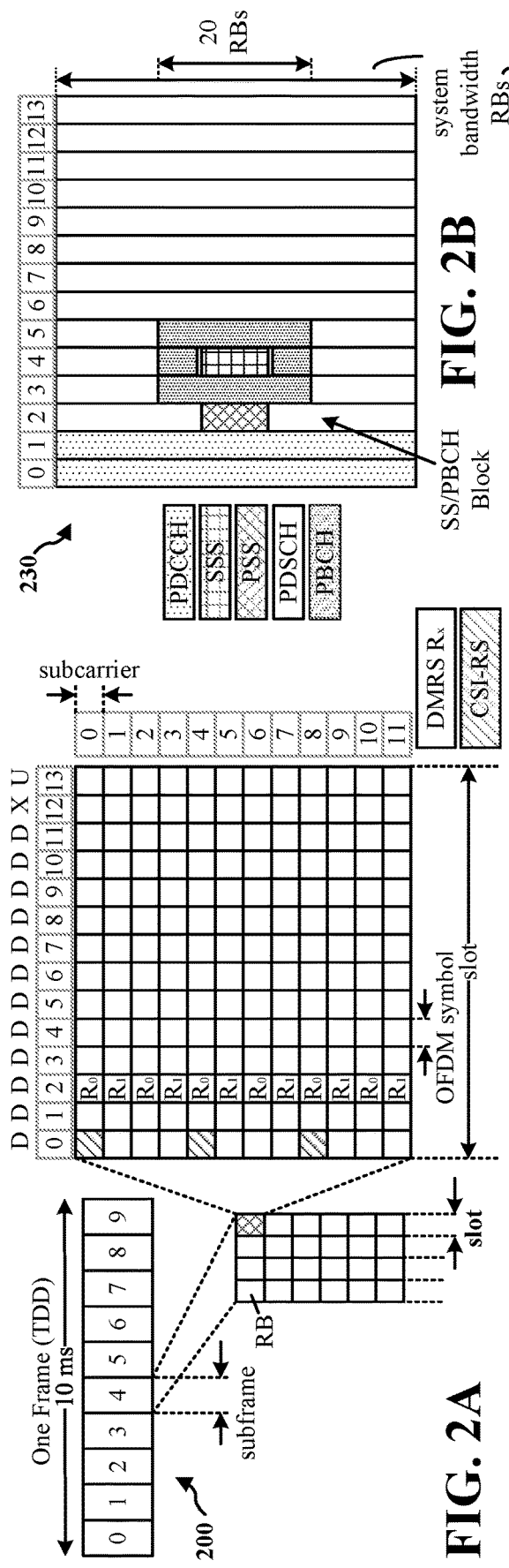
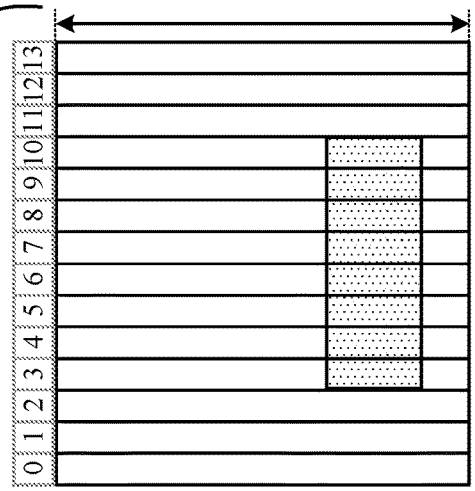
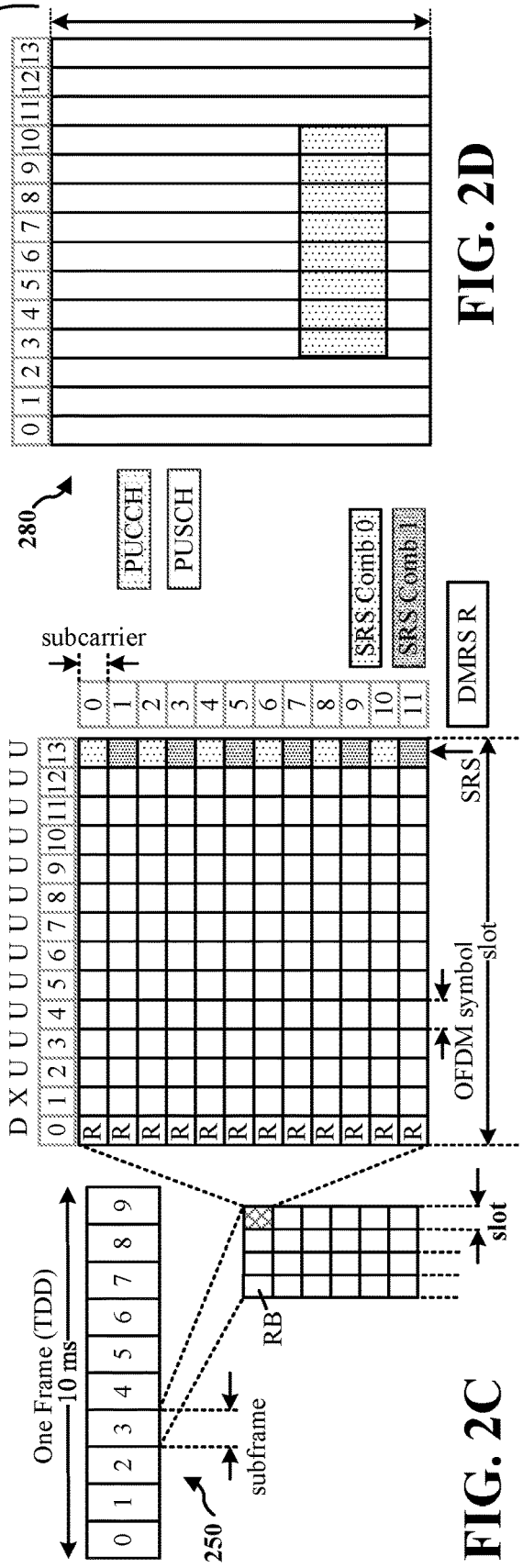
FIG. 2A
FIG. 2B
FIG. 2C
FIG. 2D

600

```
┌─────────────────────────────────────────────────────────┐
│   Identifying a sensing session configuration based on the   │
│     sensing establishment message, the sensing session     │
│   configuration comprising a set of sensing session parameters │ ～ 702
│     used for performing the sensing session, the set of sensing │
│     session parameters comprising at least one of an operating │
│       frequency band, indications of being configured as a   │
│   transmitting entity and a receiving entity for the UE and each │
│       of the one or more sidelink UEs, sensing occasion      │
│       information, a frequency bandwidth, a beam pattern,    │
│       transmit power information, a repetition pattern      │
└─────────────────────────────────────────────────────────┘
                              │
                              ▼
┌─────────────────────────────────────────────────────────┐
│  Transmitting, via the one or more sidelink communication  │ ～ 704
│    links, the sensing session configuration to the one or more │
│                         sidelink UEs                       │
└─────────────────────────────────────────────────────────┘
```

```
┌─────────────────────────────────────────────────────────┐
│     Generating an updated sensing session configuration in  │
│   response to a determination based on the one or more sensing │
│     measurement information or the second sensing outcome   │ ～ 802
│   information corresponding to the sensing session, wherein the │
│   updated sensing session configuration indicates to: add a first │
│   sidelink UE to the one or more sidelink UEs for participation │
│     in a subsequent sensing session; or remove a second sidelink │
│   UE from the one or more sidelink UEs for participation in the │
│                 subsequent sensing session                  │
└─────────────────────────────────────────────────────────┘
```

FIG. 8

SIDELINK-AIDED RADIO FREQUENCY SENSING

BACKGROUND

Technical Field

The described aspects relate generally to wireless communication systems, and more particularly, to apparatuses and methods for sidelink-based radio frequency (RF) sensing.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may be capable of performing RF sensing procedures to detect and/or track nearby objects or targets. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of sidelink-aided radio frequency (RF) sensing at a user equipment (UE) of a wireless communication network, comprising receiving, via a downlink communication link with a base station, a sensing establishment message associated with a sensing session. The method further includes receiving, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information. Additionally, the method further includes transmitting, via an uplink communication link with the base station, the one or more sensing measurement information obtained by the one or more sidelink UEs corresponding to the sensing session, or a second sensing outcome information corresponding to the sensing session. The second sensing outcome information is based on either the one or more sensing measurement information or the first sensing outcome information obtained by the one of the one or more sidelink UEs corresponding to the sensing session.

Another example aspect includes an apparatus of sidelink-aided RF sensing at a UE of a wireless communication network, comprising a memory, and a processor communicatively coupled with the memory. The processor is configured to receive, via a downlink communication link with a base station, a sensing establishment message associated with a sensing session. The processor is further configured to receive, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information. Additionally, the processor is further configured to transmit, via an uplink communication link with the base station, the one or more sensing measurement information obtained by the one or more sidelink UEs corresponding to the sensing session, or a second sensing outcome information corresponding to the sensing session. The second sensing outcome information is based on either the one or more sensing measurement information or the first sensing outcome information obtained by the one of the one or more sidelink UEs corresponding to the sensing session.

Another example aspect includes an apparatus of sidelink-aided RF sensing at a UE of a wireless communication network, comprising means for receiving, via a downlink communication link with a base station, a sensing establishment message associated with a sensing session. The apparatus further includes means for receiving, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information. Additionally, the apparatus further includes means for transmitting, via an uplink communication link with the base station, the one or more sensing measurement information obtained by the one or more sidelink UEs corresponding to the sensing session, or a second sensing outcome information corresponding to the sensing session. The second sensing outcome information is based on either the one or more sensing measurement information or the first sensing outcome information obtained by the one of the one or more sidelink UEs corresponding to the sensing session.

Another example aspect includes a computer-readable medium (e.g., non-transitory computer-readable medium) storing instructions of sidelink-aided RF sensing at a UE of a wireless communication network, executable by a processor to receive, via a downlink communication link with a base station, a sensing establishment message associated with a sensing session. The instructions are further executable to receive, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information. Additionally, the instructions are further executable to transmit, via an uplink communication link with the base station, the one or more sensing measurement information obtained by the one or more sidelink UEs corresponding to the sensing session, or a second sensing outcome information corresponding to the sensing session. The second sensing outcome information is based on either the one or more sensing measurement information or the first sensing outcome information obtained by the one of the one or more sidelink UEs corresponding to the sensing session.

Another example aspect includes a method of sidelink-aided RF sensing at a base station of a wireless communication network, comprising transmitting, to a plurality of UEs, a sensing establishment message associated with a sensing session. The plurality of UEs comprise a first UE and one or more sidelink UEs. The first UE is in communication, via one or more sidelink communication links, with the one or more sidelink UEs. The method further includes receiving, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

Another example aspect includes an apparatus of sidelink-aided RF sensing at a base station of a wireless communication network, comprising a memory, and a processor communicatively coupled with the memory. The processor is configured to transmit, to a plurality of UEs, a sensing establishment message associated with a sensing session, the plurality of UEs comprising a first UE and one or more sidelink UEs. The first UE is in communication, via one or more sidelink communication links, with the one or more sidelink UEs. The processor is further configured to receive, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

Another example aspect includes an apparatus of sidelink-aided RF sensing at a base station of a wireless communication network, comprising means for transmitting, to a plurality of UEs, a sensing establishment message associated with a sensing session. The plurality of UEs comprise a first UE and one or more sidelink UEs. The first UE is in communication, via one or more sidelink communication links, with the one or more sidelink UEs. The apparatus further includes means for receiving, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

Another example aspect includes a computer-readable medium (e.g., non-transitory computer-readable medium) storing instructions of sidelink-aided RF sensing at a base station of a wireless communication network, executable by a processor to transmit, to a plurality of UEs, a sensing establishment message associated with a sensing session, the plurality of UEs comprising a first UE and one or more sidelink UEs. The first UE is in communication, via one or more sidelink communication links, with the one or more sidelink UEs. The instructions are further executable to receive, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 7 is a flowchart of first additional or optional steps for the method of sidelink-aided RF sensing at the UE in accordance with various aspects of the present disclosure.

FIG. 8 is a flowchart of second additional or optional steps for the method of sidelink-aided RF sensing at the UE in accordance with various aspects of the present disclosure.

DETAILED DESCRIPTION

Figure 1:
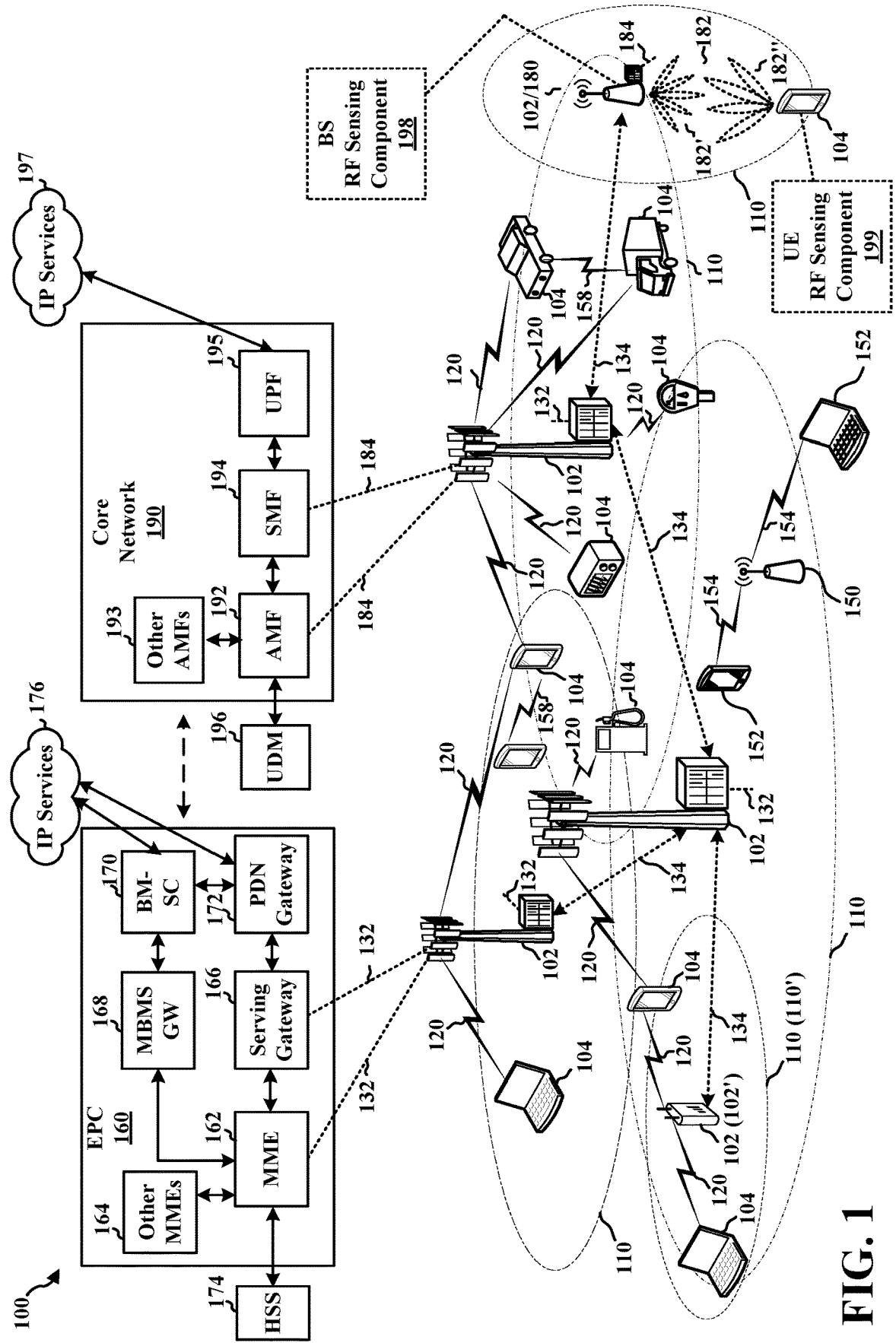
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional wireless communication systems may be capable of performing RF sensing procedures to detect and/or track nearby objects or targets. Such capabilities may be used to provide consumers of the wireless communication system with several consumer-level RF sensing (e.g., radar-based) applications, such as contextual information acquisition (e.g., location detection and/or tracking, direction finding, range estimation). However, in some aspects, RF sensing procedures may not leverage sidelink communication links to assist in the RF sensing procedures.

Aspects presented herein provide for multiple manners for performing sidelink aided RF sensing. In some aspects, the UEs participating in the RF sensing session may coordinate and/or collect measurement results via sidelink communication links established between the participating UEs. Further, aspects presented herein may improve accuracy, enhance a sensing coverage area, reduce interference, and increase resource efficiency, when compared to a conventional communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the UE 104 may include a UE radio frequency (RF) sensing component 199. The UE RF sensing component 199 may be configured to perform sidelink-aided RF sensing. For example, the UE RF sensing component 199 may receive a sensing establishment message associated with a sensing session, receive one or more sensing measurement information or a first sensing outcome information corresponding to the sensing session, and transmit the one or more sensing measurement information or a second sensing outcome information corresponding to the sensing session.

Similarly, the base station 102 may include a base station (BS) RF sensing component 198. The BS RF sensing component 198 may be configured to perform sidelink-aided RF sensing. For example, the UE RF sensing component 199 may transmit a sensing establishment message associated with a sensing session, and receive one or more sensing measurement information or sensing outcome information corresponding to the sensing session.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^{\mu}0*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
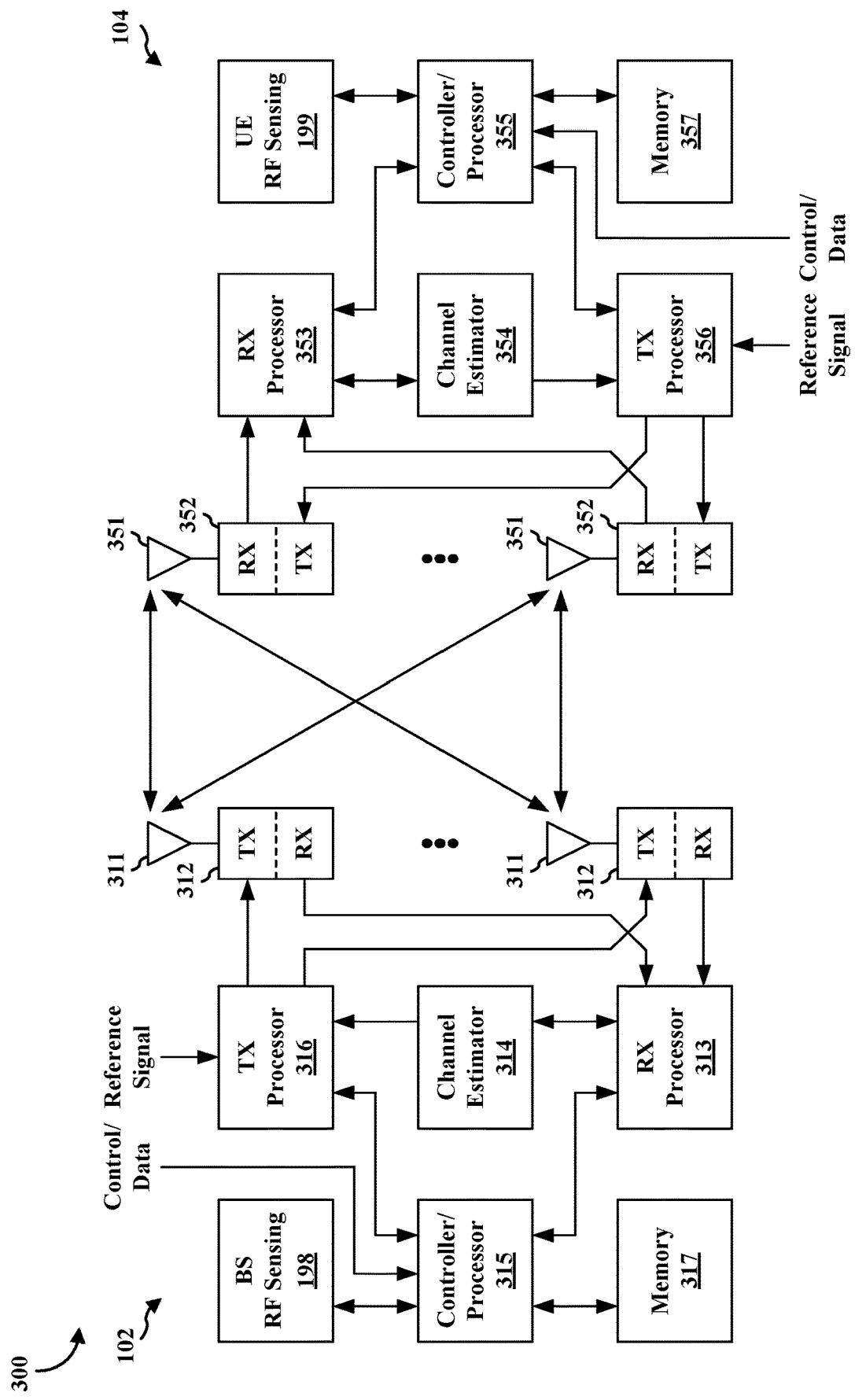
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a BS RF sensing component 198. The BS RF sensing component 198 may be configured to perform sidelink-aided RF sensing. For example, the UE RF sensing component 199 may transmit a sensing establishment message associated with a sensing session, and receive one or more sensing measurement information or sensing outcome information corresponding to the sensing session.

In other aspects, at least one of the TX processor 316, the RX processor 313, and the controller/processor 315 may be configured to perform aspects in connection with the BS RF sensing component 198 of FIG. 1. For example, the memory 317 may store computer-executable instructions defining the BS RF sensing component 198. In other aspects, the TX processor 316, the RX processor 313, and/or the controller/processor 315 may be configured to execute the BS RF sensing component 198.

In some aspects, the UE 104 may comprise a UE RF sensing component 199. The UE RF sensing component 199 may be configured to perform sidelink-aided RF sensing. For example, the UE RF sensing component 199 may receive a sensing establishment message associated with a sensing session, receive one or more sensing measurement information or a first sensing outcome information corresponding to the sensing session, and transmit the one or more sensing measurement information or a second sensing outcome information corresponding to the sensing session.

In other aspects, at least one of the TX processor 356, the RX processor 353, and the controller/processor 355 may be configured to perform aspects in connection with the UE RF sensing component 199 of FIG. 1. For example, the memory 357 may store computer-executable instructions defining the UE RF sensing component 199. In other aspects, the TX processor 356, the RX processor 353, and/or the controller/processor 259 may be configured to execute the UE RF sensing component 199.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

In some aspects, wireless communication systems may be capable of performing RF sensing. That is, wireless communication devices (e.g., base station, UE) may be capable of transmitting RF sensing signals (e.g., waveforms) and/or receiving reflections of the transmitted waveforms and analyzing the received waveforms to detect and/or track nearby objects or targets. Such capabilities may enable the wireless communication devices to provide a number of consumer-level RF sensing applications (e.g., radar-based). For example, some consumer-level radar-based applications may comprise smart cruise control, collision avoidance, and/or obstacle detection in the automotive domain. Alternatively or additionally, the RF sensing capabilities may enable applications for contextual information acquisition, such as location detection and/or tracking, direction finding, range estimation, and/or indoor mapping applications. In some aspects, the consumer-level radar-based applications may comprise health monitoring and/or biomedical scanning applications (e.g., heartbeat detection, respiration rate monitoring). In other aspects, the RF sensing capabilities may enable applications for gesture recognition, such as, human activity recognition, keystroke detection, and/or sign language recognition.

Wireless communication systems may deploy RF sensing in one of several deployment modes. One such deployment mode, that may be generally referred to as a monostatic deployment, may comprise one transmitter (Tx) and one receiver (Rx) (e.g., one Tx/Rx pair) in which the transmitter (e.g., transmitting entity) and the receiver (e.g., receiving entity) are co-located. For example, a monostatic deployment may comprise a single co-located Tx/Rx pair. In another deployment mode, a bistatic deployment may refer to an RF sensing deployment comprising one non-collocated Tx/Rx pair. That is, the bistatic deployment may comprise one transmitter and one receiver that may be geographically distant from one another.

In other optional or additional aspects, a multi-static deployment may refer to an RF sensing deployment comprising multiple transmitters and/or multiple receivers. For example, the number of deployed transmitters may match the number of deployed receivers. In another example, the number of deployed transmitters may not match (i.e., be different to) the number of deployed receivers.

In other optional or additional aspects, the transmitters and/or receivers of the multi-static deployment may be operating on a same RF sensing session. For example, the transmitters and/or receivers of the multi-static deployment may be attempting to detect and/or track a same target or object. Alternatively or additionally, a first portion of the transmitters and/or receivers of the multi-static deployment may be operating on a first RF sensing session and a second portion of the transmitters and/or receivers may be operating on a second RF sensing session. For example, the first portion of the transmitters and/or receivers may be attempting to detect and/or track a first target or object and the second portion of the transmitters and/or receivers may be attempting to detect and/or track a second target or object.

Multi-static deployments may be monostatic-based (e.g., at least a portion of the transmitters and the receivers of the multi-static deployment may be co-located) or bistatic-based (e.g., one or more of the transmitters and/or receivers of the multi-static deployment may be geographically distant from another transmitter and/or receiver of the multi-static deployment).

In other optional or additional aspects, multi-static deployments may be configured as "gNB-based," "UE-based," or "fully-UE-based." In an example multi-static deployment configured as a gNB-based deployment, one or more of the gNBs (e.g., base stations) of the multi-static deployment may be configured as transmitters, and the remaining devices of the multi-static deployment (e.g., gNBs, UEs) may be configured as receivers. That is, a gNB-based multi-static deployment may refer to a deployment in which one or more gNBs may be configured to transmit RF sensing signals and the remaining devices may be configured to receive reflected RF sensing signals. Similarly, in an example multi-static deployment configured as a UE-based deployment, one or more of the UEs of the multi-static deployment may be configured as transmitters, and the remaining devices of the multi-static deployment (e.g., gNBs, UEs) may be configured as receivers. That is, a UE-based multi-static deployment may refer to a deployment in which one or more UEs may be configured to transmit RF sensing signals and the remaining devices may be configured to receive reflected RF sensing signals.

Alternatively or additionally, a fully-UE-based multi-static deployment may comprise a first set of UEs configured as transmitters and a second set of UEs configured as receivers. That is, in a fully-UE-based multi-static deployment all transmitting and/or receiving of RF sensing signals in an RF sensing session may be performed by one or more UEs. In some aspects, the one or more UEs may communicate with each other using sidelink communications as described in one or more regulations and/or standards (e.g., 3GPP). That is, the plurality of UEs may exchange RF sensing information (e.g., control and/or data) corresponding to the RF sensing sessions via one or more sidelink communication links. In other aspects, one or more UEs may coordinate the RF sensing sessions with the wireless communication network (e.g., gNB, base station) via one or more downlink and/or uplink communication links.

Aspects presented herein provide for multiple manners for performing sidelink aided RF sensing with fully-UE-based multi-static deployments. In some aspects, a master UE node may coordinate, via one or more downlink and/or uplink communication links, with the wireless communication network (e.g., gNB, base station) to establish a RF sensing session, and may coordinate, via one or more sidelink communication links, with the remaining UEs of the fully-UE-based multi-static deployment to perform the RF sensing session. In other aspects, the wireless communication network (e.g., gNB, base station) may configure, via one or more downlink and/or uplink communication links, a plurality of UEs to perform the RF sensing session, and the plurality of UEs may coordinate, via one or more sidelink communication links, with each other to perform the RF sensing session.

Advantageously, the aspects presented herein may provide for a network device (e.g., gNB, base station) to detect and/or track objects that may be near to one or more RF sensing nodes (e.g., UEs) but that may be located outside of a coverage area of the network device, and, as such, result in an enhanced RF sensing coverage area for the wireless communication network. That is, RF sensing nodes that may be located outside of the RF sensing coverage area for the network device may enhance the RF sensing coverage area for the network device. In addition, the aspects presented herein may reduce possible interference caused by RF sensing by configuring the RF sensing nodes (e.g., UEs) to perform the RF sensing at a different frequency band than the operating frequency band for the wireless communication network (e.g., gNB, base station). Furthermore, by offloading the RF sensing data collection and/or analysis operations to the RF sensing nodes (e.g., UEs), the network device may reduce a processing load, and, as such, may free up resources for other operations. Moreover, the aspects presented herein may improve RF sensing accuracy if or when the objects and/or targets being sensed are located closer in range to the RF sensing nodes (e.g., UEs) than to the network device (e.g., gNB, base station), and thus may result in an improved RF sensing accuracy when compared to conventional RF sensing procedures that may rely on the network device to perform the RF sensing.

Figure 4A:
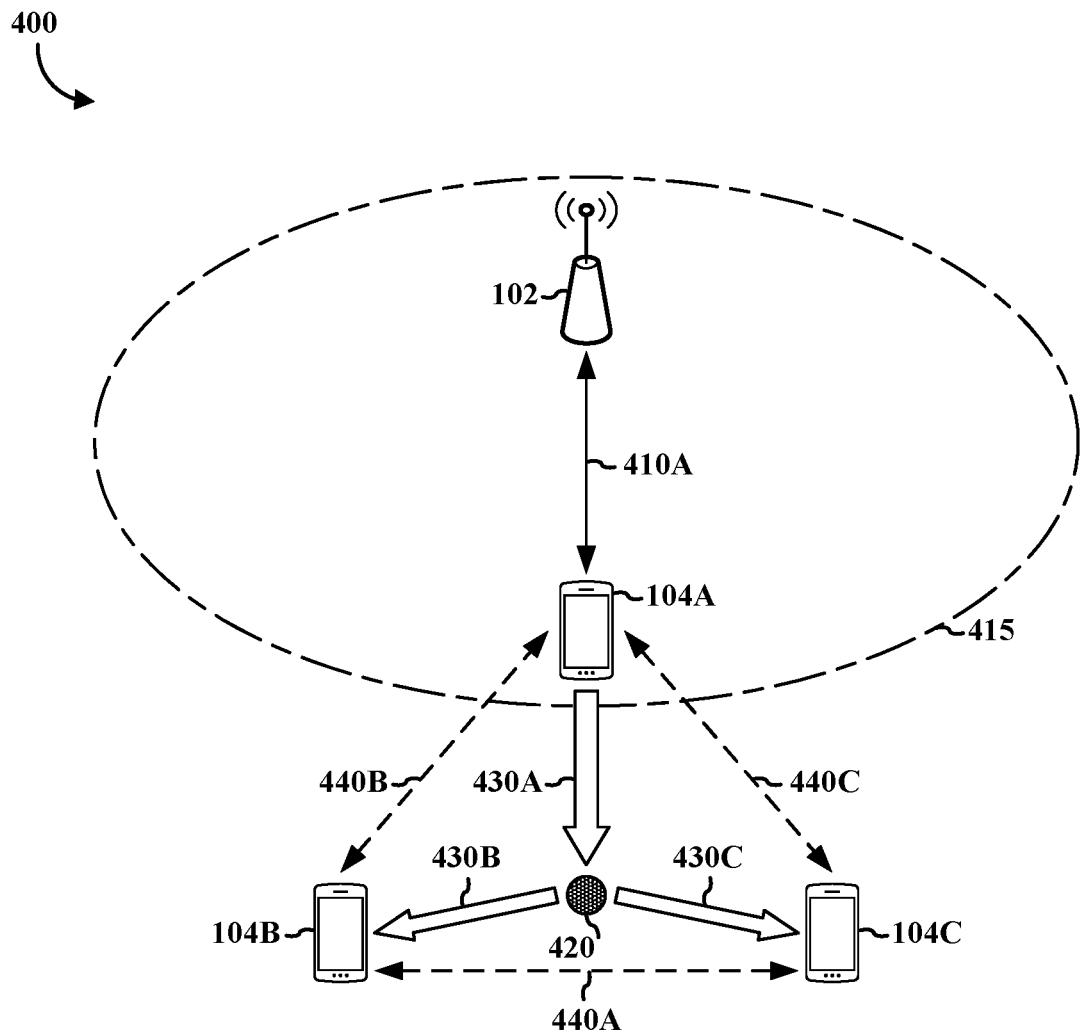
FIG. 4A is a diagram illustrating a first example of a sidelink-aided radio frequency (RF) sensing session, in accordance with various aspects of the present disclosure.

FIG. 4A illustrates a diagram 400 of a first example of a sidelink-aided radio RF sensing session performed by a network device 102 (e.g., gNB, base station), a master UE node 104A, and sidelink UEs 104B-C in an access network (e.g., access network 100). The base station 102 may include and/or may be similar in many respects to the base station 102 described above with reference to FIGS. 1 and 3, and may include additional features not mentioned above. The base station 102 may include a BS RF sensing component 198. The master UE node 104A and the sidelink UEs 104B-C may include and/or may be similar in many respects to the UE 104 described above with reference to FIGS. 1 and 3, and may include additional features not mentioned above. The master UE node 104A and the sidelink UEs 104B-C may include a UE RF sensing component 199.

In some aspects, the master UE node 104A may be located within a coverage area 415 of the base station 102, as shown in FIG. 4A. The master UE node 104A may communicate with base station 102 via communication link 410A. The communication link 410A may comprise one or more active downlink and/or uplink channels for exchanging information (e.g., control and/or data) between the master UE node 104A and the base station 102. For example, the communication link 410A may comprise one or more physical channels such as a physical downlink control channel (PDCCH), a physical broadcast channel (PBCH), a physical downlink shared channel (PDSCH), a physical uplink control channel (PUCCH), and a physical uplink shared channel (PUSCH). Alternatively or additionally, the master UE node 104A may communicate with the sidelink UEs 104B-C via sidelink communication links 440A-C (hereinafter "440"). For example, the master UE node 104A may communicate with sidelink UE 104B via sidelink communication link 440B, and may communicate with sidelink UE 104C via sidelink communication link 440C. The sidelink communication links 440 may comprise one or more sidelink channels for exchanging RF sensing information (e.g., control and/or data) between the sidelink UEs 104B-C and the master UE node 104A. For example, the sidelink communication links 440 may comprise one or more physical channels, such as a physical sidelink broadcast channel (PSBCH), a physical sidelink discovery channel (PSDCH), a physical sidelink shared channel (PSSCH), and a physical sidelink control channel (PSCCH).

The sidelink UEs 104B-C may be located outside of the coverage area 415, and, as such, may not communicate directly with the base station 102. For example, the sidelink UEs 104B-C may communicate with the base station 102 via the master UE node 104A using a sidelink communication link 440. In some aspects, the sidelink UEs 104B-C may communicate directly with each other via a sidelink communication link 440. For example, sidelink UE 104B may communicate directly with sidelink UE 104C via sidelink communication link 440A. Alternatively or additionally, the sidelink UEs 104B-C may not communicate directly with each other, and instead may communicate via the master UE node 104A. For example, the sidelink communication link 440A may not be present and/or established, and, as such, the sidelink UE 104B may communicate with sidelink UE 104C via master UE node 104A. In other optional or additional aspects, the master UE node 104A may communicate with sidelink UEs 104B-C via another sidelink UE 104B-C. For example, the master UE node 104A may communicate with sidelink UE 104C via sidelink UE 104B.

The base station 102 may communicate with the master UE node 104A to establish an RF sensing session. For example, the base station 102 may send, to the master UE node 104A via the downlink channel of the communication link 410, a sensing establishment message associated with the RF sensing session. The sensing establishment message may indicate to the master UE node 104A that the master UE node 104A may be responsible for coordinating the RF sensing session with the sidelink UEs 104B-C with which the master UE node 104A maintains a sidelink connection via the sidelink communication links 440.

In some aspects, the master UE node 104A may be configured to determine a node partition configuration for the RF sensing session. The node partition configuration may indicate for each UE (e.g., 104A-C) performing the RF sensing session whether that UE will perform as a transmitting entity, as a receiving entity, or as both a transmitting entity and a receiving entity (e.g., monostatic) during the RF sensing session. For example, as shown in FIG. 4A, the master UE node 104A may determine to configure the master UE node 104A as a transmitting entity and to configure the sidelink UEs 104B-C as receiving entities.

In other optional or additional aspects, the master UE node 104A may determine the node partition configuration for a particular UE 104A-C according to several factors, including, but not limited to, a transmit power level of the UE 104A-C, and a geographic location of the UE 104A-C. For example, the master UE node 104A may configure a UE 104A-C having a high transmit power as a transmitting entity and may configure another UE 104A-C having a low transmit power as a receiving entity. Alternatively or additionally, the master UE node 104A may configure transmitting and receiving entities according to their respective geographic locations to attempt to maximize an RF sensing coverage area of the RF sensing session. In other aspects, the master UE node 104A may determine the node partition configuration according to a round-robin schedule by which every UE 104A-C may be configured as a transmitting entity while the remaining UE 104A-C may be configured as receiving entities.

In other optional or additional aspects, the UEs 104A-C may establish the node partition configuration based on a communication exchange between the UEs 104A-C performed using the sidelink communication links 440. That is, the UEs 104A-C may determine the node partition configuration without assistance from the access network 100 (e.g., base station 102) based on the communication exchange performed via the sidelink communication links 440.

In some aspects, the master UE node 104A may be configured to identify a sensing session configuration, based at least on the sensing establishment message. The sensing session configuration may comprise a set of proposed sensing session parameters for the RF sensing session. The set of proposed sensing session parameters may comprise at least one of an operating frequency band, the node partition configuration, sensing occasion information, a frequency bandwidth, a beam pattern, transmit power information, and a repetition pattern. In some aspects, the master UE node 104A may send, to the base station 102 via the communication link 410, the set of proposed sensing session parameters. The base station 102 may analyze the set of proposed sensing session parameters and determine whether to accept the set of proposed sensing session parameters and/or modify the set of proposed sensing session parameters according to the analysis. For example, the base station 102 may determine whether one or more of the proposed sensing session parameters may be incompatible (e.g., cause interference) with other resources and/or devices within the coverage area 415 of the base station 102. The base station 102 may send an approved set of sensing session parameters to the master UE node 104A via the communication link 410 in response to receiving the set of proposed sensing session parameters.

In some aspects, the master UE node 104A may be configured to transmit, via the sidelink communication links 440, the sensing session configuration to the sidelink UEs 104B-C. The sensing session configuration may comprise the approved set of sensing session parameters received from the base station 102. That is, the master UE node 104A may configure the sidelink UEs 104B-C to perform the RF sensing session according to the sensing session configuration.

The master UE node 104A may be configured to initiate RF sensing sessions according to criteria indicated by the sensing establishment message. In some aspects, the sensing establishment message may indicate opportunistic criteria comprising at least one of sidelink network topology conditions, UE-specific conditions, and RF quality conditions. That is, the master UE node 104A may be configured to initiate an RF sensing session in an opportunistic manner in response to determining that at least one of the opportunistic criteria have been met. For example, the sensing establishment message may indicate sidelink network topology conditions that may include determining whether the existence of a sidelink UE 104B-C such that the location of the sidelink UE 104B-C may enable the RF sensing session to cover a certain region of interest for the access network 100, and/or, determining whether a quantity (e.g., count) of sidelink communication links 440 exceeds a certain minimum threshold. In another example, the sensing establishment message may indicate UE-specific conditions that may include determining whether one or more characteristics of the UEs 104A-C meet a corresponding criteria, such as a battery level exceeding a minimum level threshold and/or a transmit power level exceeding a minimum power threshold. In another example, the sensing establishment message may indicate RF quality conditions that may include determining whether a channel quality metric (e.g., signal-to-noise ratio (SNR), block error rate (BLER)) meets a corresponding criteria.

In other optional or additional aspects, the sensing establishment message may indicate deterministic (e.g., planned) criteria that may indicate one or more time occasions at which the RF sensing session is to be initiated. The deterministic criteria may be periodic, semi-persistent, or aperiodic. That is, the sensing establishment message may indicate periodic deterministic criteria that may indicate a set of time occasions that may be repeated periodically. Alternatively or additionally, the sensing establishment message may indicate semi-persistent deterministic criteria that may indicate a set of time occasions that may be repeated periodically and may require activation from the base station 102 to occur. That is, the master UE node 104A may require activation of the time occasion from the base station 102 prior to initiating an RF sensing session at that time occasion. In addition, the sensing establishment message may indicate aperiodic deterministic criteria that may indicate a single time occasion at which the RF sensing session is to be initiated. For example, the sensing establishment message may indicate a particular time occasion at which the RF sensing session is to be initiated.

In other optional or additional aspects, the sensing establishment message may indicate a combination of opportunistic criteria and deterministic criteria. For example, the sensing establishment message may indicate to initiate an RF sensing session at a particular time occasion if or when one or more opportunistic criteria are met (e.g., quantity of sidelink communication links 440 exceeds a certain minimum threshold, whether region of interest is covered by RF sensing session).

The UEs 104 A-C may be configured to perform the RF sensing session according to the sensing session configuration in response to a determination that the opportunistic criteria and/or deterministic criteria for initiating the RF sensing session have been met. That is, a portion of the UEs (e.g., 104A) may be configured as transmitting entities may transmit an RF sensing signal 430A. In some aspects, the transmitting entities may perform beamforming techniques to direct the RF sensing signal 430A towards an object (or target) 420. In addition, a portion of the UEs (e.g., 104B-C) may be configured as receiving entities may receive a reflected RF sensing signal (e.g., 430B-C) from the object 420. That is, one or more of the receiving entities (e.g., 104B-C) may receive at least a portion of the RF sensing signal 430A that may have been reflected by the object 420 towards the receiving entities.

The receiving entities 104B-C may be further configured to perform one or more measurements on the reflected RF sensing signals 430B-C. For example, the receiving entities 104B-C may measure a power level of the reflected RF sensing signals 430B-C as a function of time and/or as a function of frequency. Alternatively or additionally, the receiving entities 104B-C may measure a propagation delay and/or a Doppler shift of the reflected RF sensing signals 430B-C.

In some aspects, the receiving entities 104B-C may be configured to send, to the master UE node 104A via the sidelink communication links 440, measurement data corresponding to the RF sensing session. For example, the measurement data may comprise raw measurement data corresponding to the RF sensing session. The raw measurement data may be in a time-domain format (e.g., power levels as a function of time) or in a frequency-domain format (e.g., power levels as a function of frequency). Alternatively or additionally, the measurement data may comprise a compressed representation of the raw measurement data.

In these aspects, the master UE node 104A may be configured to collect the measurement data received from the receiving entities 104B-C and to report the collected measurement data to the access network 100. That is, the master UE node 104A may be configured to send, to the base station 102 via the communication link 410A, the collected measurement data. Alternatively or additionally, the master UE node 104A may be configured to determine sensing outcome information based at least on the measurement data received from the receiving entities 104B-C, and to report the sensing outcome information to the base station 102 via the communication link 410A. The sensing outcome information may indicate a likelihood of whether one or more objects (e.g., targets) were detected at one or more locations.

In other optional or additional aspects, the receiving entities 104B-C may be configured to determine sensing outcome information corresponding to the RF sensing session, and to report, to the master UE node 104A via the sidelink communication links 440, the sensing outcome information. The master UE node 104A may collect the sensing outcome information received from the receiving entities 104B-C, and may report the collected sensing outcome information to the base station 102 via the communication link 410A. Alternatively or additionally, the master UE node 104A may be configured to determine a second sensing outcome information based on the collected sensing outcome information and to report the second sensing outcome information to the base station 102 via the communication link 410A.

In some aspects, the master UE node 104A may report the sensing outcome information in response to determining that a confidence level of the sensing outcome information satisfies a confidence threshold. For example, the master UE node 104A may report the sensing outcome information if or when the confidence level of the sensing outcome information satisfies the confidence threshold. Alternatively or additionally, the master UE node 104A may refrain from reporting the sensing outcome information if or when the confidence level of the sensing outcome information does not satisfy the confidence threshold.

In other optional or additional aspects, the master UE node 104A may be configured to send, to the base station 102 via the communication link 410A, supplemental measurement information associated with the collected measurement data. For example, the supplemental measurement information may indicate geographical position information corresponding to the UEs 104A-C. The geographical position information may indicate an absolute location of the corresponding UE 104A-C in a global reference frame and/or may indicate a relative position (e.g., position relative to the master UE node 104A and/or base station 102). In another example, the supplemental measurement information may indicate an internal clock value corresponding to the UEs 104A-C, such as clock drift (e.g., 10 ppm).

In some aspects, the base station 102 may be configured to generate an updated sensing establishment message associated with a subsequent RF sensing session. The base station 102 may update the sensing session configuration of the sensing establishment message in response to receiving the measurement data and/or the sensing outcome information from the master UE node 104A. For example, the base station 102 may determine, according to the measurement data and/or the sensing outcome information, to add a sidelink UE to the sidelink UEs 104B-C for participation in the subsequent RF sensing session. Alternatively or additionally, the base station 102 may determine, according to the measurement data and/or the sensing outcome information, to remove a sidelink UE from the sidelink UEs 104B-C for participation in the subsequent RF sensing session. For example, the base station 102 may determine to add and/or remove a sidelink UE according to geographical location information of the sidelink UEs 104B-C. That is, the base station 102 may determine to add a sidelink UE if or when the geographical location information of the sidelink UE indicates that the sidelink UE may provide coverage in a region of interest. Alternatively or additionally, the base station 102 may determine to remove a sidelink UE if or when the geographical location information of the sidelink UE indicates that the sidelink UE may provide coverage in a region already covered by another sidelink UE. In some aspects, the base station 102 may send the updated sensing establishment message to the master UE node 104A via radio resource control (RRC) signaling, medium access control (MAC) control element (MAC-CE) signaling, or downlink control information (DCI) signaling.

In other optional or additional aspects, the master UE node may be configured to generate the updated sensing establishment message associated with the subsequent RF sensing session, as described above.

Although the example system illustrated in FIG. 4A shows a particular arrangement and configuration of network devices (e.g., base station 102, master UE node 104A, and sidelink UEs 104B-C), it should be understood that the quantity, arrangement and configuration of the network devices may differ without deviating from the scope of the present disclosure. Notably, the present disclosure may be employed in any wireless communication system in which sidelink-aided RF sensing is to be performed.

Figure 4B:
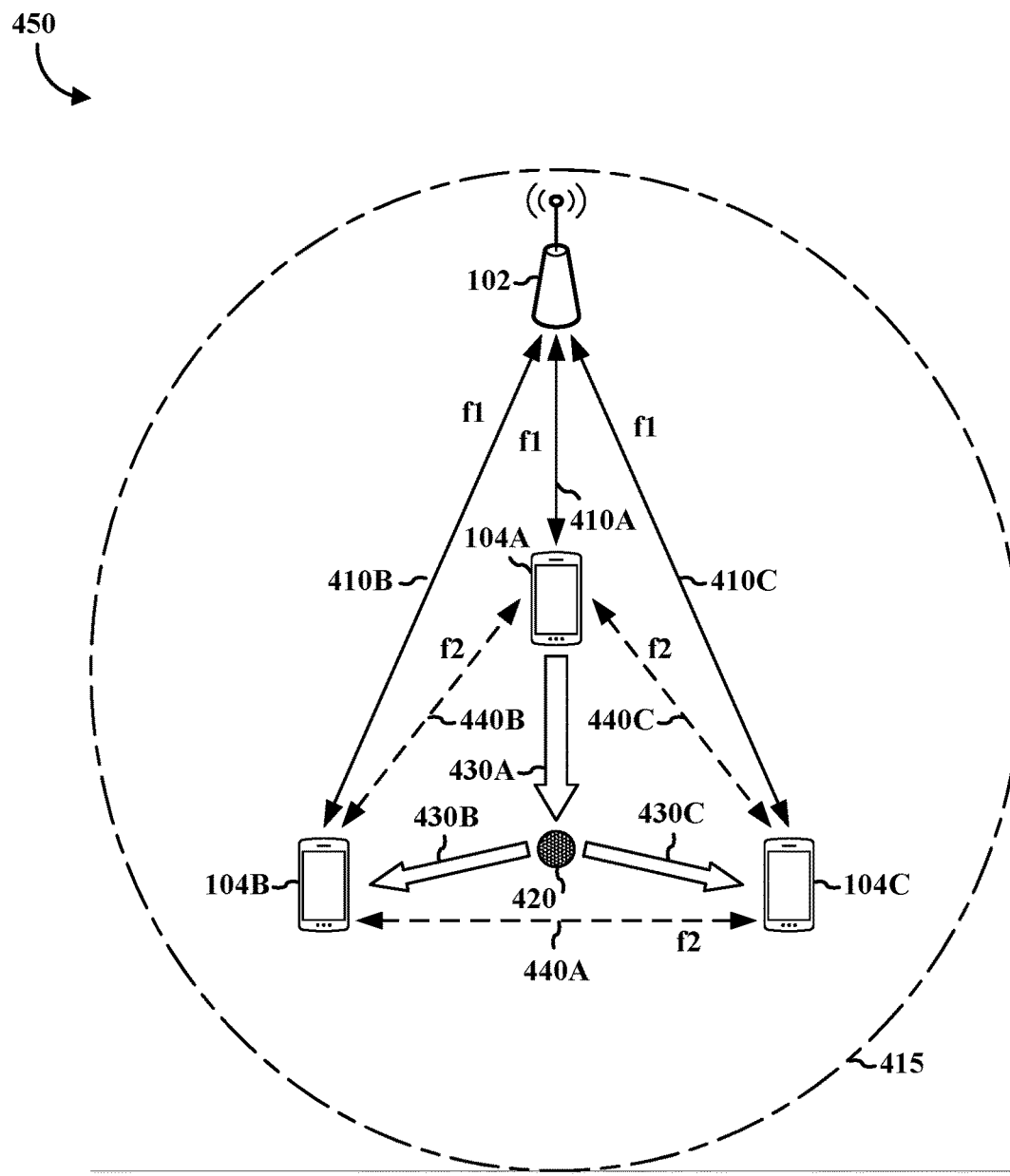
FIG. 4B is a diagram illustrating a second example of a sidelink-aided RF sensing session, in accordance with various aspects of the present disclosure.

FIG. 4B illustrates a diagram 450 of a second example of a sidelink-aided radio RF sensing session performed by a network device 102 (e.g., gNB, base station) and sidelink UEs 104A-C (hereinafter "104") in an access network (e.g., access network 100). The base station 102 may include and/or may be similar in many respects to the base station 102 described above with reference to FIGS. 1, 3, and 4A, and may include additional features not mentioned above. The base station 102 may include a BS RF sensing component 198. The sidelink UEs 104 may include and/or may be similar in many respects to the UE 104 described above with reference to FIGS. 1, 3, and 4A, and may include additional features not mentioned above. The sidelink UEs 104 may include a UE RF sensing component 199.

In some aspects, the sidelink UEs 104 may be located within a coverage area 415 of the base station 102, as shown in FIG. 4B. The sidelink UEs 104 may communicate with base station 102 via communication links 410A-C (hereinafter "410"). The communication links 410 may comprise one or more active downlink and/or uplink channels for exchanging information (e.g., control and/or data) between the sidelink UEs 104 and the base station 102. For example, the communication link 410A may comprise one or more physical channels such as a physical downlink control channel (PDCCH), a physical broadcast channel (PBCH), a physical downlink shared channel (PDSCH), a physical uplink control channel (PUCCH), and a physical uplink shared channel (PUSCH).

Alternatively or additionally, the sidelink UEs 104 may communicate with each other via sidelink communication links 440A-C (hereinafter "440"). The sidelink communication links 440 may comprise one or more sidelink channels for exchanging RF sensing information (e.g., control and/or data) between the sidelink UEs 104. For example, the sidelink communication links 440 may comprise one or more physical channels, such as a physical sidelink broadcast channel (PSBCH), a physical sidelink discovery channel (PSDCH), a physical sidelink shared channel (PSSCH), and a physical sidelink control channel (PSCCH).

In some aspects, the sidelink communication links 440 may operate in a different frequency band (e.g., "f2") than the communication links 410 (e.g., "f1"). That is, the sidelink communication links 440 may be considered to be "out-of-band" in comparison to the communication links 410.

The base station 102 may be configured to communicate with the sidelink UEs 104 to establish an RF sensing session. For example, the base station 102 may send, to the sidelink UEs 104 via the communication links 410, a sensing establishment message associated with the RF sensing session. The sensing establishment message may indicate, to the sidelink UEs 104, a sensing session configuration for the RF sensing session. The sensing session configuration may comprise at least one of an operating frequency band, the node partition configuration, sensing occasion information, a frequency bandwidth, a beam pattern, transmit power information, and a repetition pattern.

In some aspects, the base station 102 may be configured to determine a node partition configuration for the RF sensing session in a manner similar to the one described in further detail above in reference to FIG. 4A.

In other optional or additional aspects, the sidelink UEs 104 may establish the node partition configuration based on a communication exchange between the sidelink UEs 104 performed using the sidelink communication links 440 as described above in reference to FIG. 4A.

The sidelink UEs 104 may be configured to initiate RF sensing sessions according to criteria indicated by the sensing establishment message. The sensing establishment message may indicate opportunistic criteria, deterministic criteria, or a combination thereof, as described above in reference to FIG. 4A.

The sidelink UEs 104 may be configured to perform the RF sensing session according to the sensing session configuration and to perform one or more measurements on the received reflected RF sensing signals (e.g., 430B-C) to generate measurement data corresponding to the RF sensing session, as described above in reference to FIG. 4A.

In some aspects, the sidelink UEs 104 may consolidate the measurement data corresponding to the RF sensing session at a designated UE of the sidelink UEs 104. That is, the sidelink UEs 104 send corresponding measurement data to the designated UE via the sidelink communication links 440. The designated UE may collect the measurement data received from the remaining sidelink UEs 104 and report the collected measurement data to the access network 100. That is, the designated UE may be configured to send, to the base station 102 via the communication links 410, the collected measurement data. Alternatively or additionally, the designated UE may be configured to determine sensing outcome information based at least on the measurement data received from the sidelink UEs 104, and to report the sensing outcome information to the base station 102 via the communication links 410. In other optional or additional aspects, the designated UE may forward, via the sidelink communication links 440, the sensing outcome information to another sidelink UE for reporting to the base station 102. In other optional or additional aspects, the designated UE may be determined according to a processing and/or computational capability of the designated UE.

In other optional or additional aspects, each sidelink UE of the sidelink UEs 104 may determine sensing outcome information based at least on the measurement data of that sidelink UE 104 and may report the sensing outcome information to the designated UE. Alternatively or additionally, the sidelink UEs 104 may determine the sensing outcome information based on a communication exchange between the sidelink UEs 104 performed using the sidelink communication links 440. That is, the sidelink UEs 104 may determine the sensing outcome information (e.g., likelihood measurements of target existences at different locations) in a cooperative manner based on the communication exchange performed via the sidelink communication links 440. The sensing outcome information may be reported to the base station 102 by the designated UE.

In some aspects, the base station 102 may be configured to generate an updated sensing establishment message associated with a subsequent RF sensing session, as described above in reference to FIG. 4A.

Although the example system illustrated in FIG. 4B shows a particular arrangement and configuration of network devices (e.g., base station 102 and sidelink UEs 104), it should be understood that the quantity, arrangement and configuration of the network devices may differ without deviating from the scope of the present disclosure. Notably, the present disclosure may be employed in any wireless communication system in which sidelink-aided RF sensing is to be performed.

Figure 5:
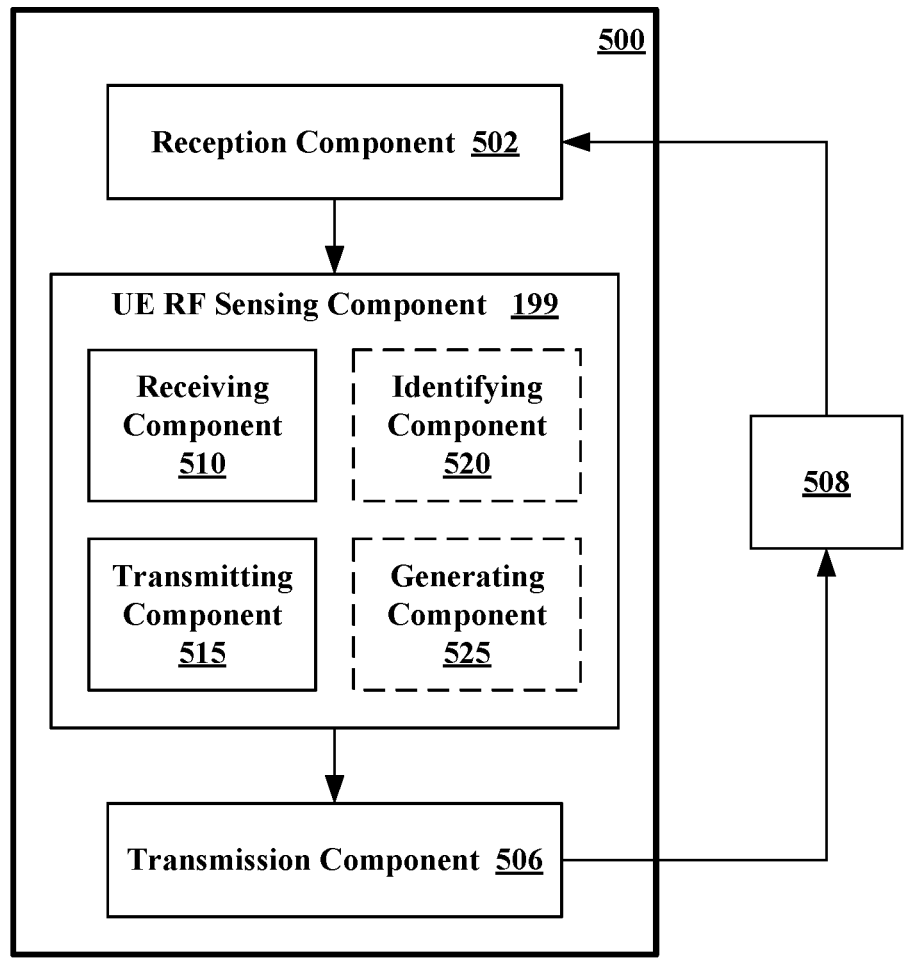
FIG. 5 is a diagram illustrating an example apparatus, such as a user equipment (UE), for sidelink-aided RF sensing, in accordance with various aspects of the present disclosure.

FIG. 5 is a block diagram of an example apparatus 500 for wireless communication. The apparatus 500 may be a UE 104 (e.g., UE 104 of FIGS. 1, 3, and 4A-4B) or a UE 104 may include the apparatus 500. In some aspects, the apparatus 500 may include a reception component 502 configured to receive wireless communications from another apparatus (e.g., apparatus 508), a UE RF sensing component 199 configured to perform sidelink-aided RF sensing, a transmission component 506 configured to transmit wireless communications to another apparatus (e.g., apparatus 508), and which may be in communication with one another (e.g., via buses or electrical connections). As shown, the apparatus 500 may be in communication with another apparatus 508 (such as a base station 102, or another wireless communication device) using the reception component 502 and the transmission component 506.

In some aspects, the apparatus 500 may be configured to perform one or more operations described herein in connection with FIGS. 1, 3, and 4A-4B. Alternatively or additionally, the apparatus 500 may be configured to perform one or more processes described herein, such as method 600 of FIGS. 6-8. In some aspects, the apparatus 500 may include one or more components of the UE 104 described above in connection with FIGS. 1, 3, and 4A-4B.

The reception component 502 may receive communications, such as reference signals, control information, data communications, or a combination thereof, from the apparatus 508. The reception component 502 may provide received communications to one or more other components of the apparatus 500, such as the UE RF sensing component 199. In some aspects, the reception component 502 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 502 may include one or more antennas, a demodulator, a MIMO detector, a receive processor, a controller/processor, a memory, or a combination thereof, of the UE 104 described above in connection with FIGS. 1, 3, and 4A-4B.

The transmission component 506 may transmit communications, such as reference signals, control information, data communications, or a combination thereof, to the apparatus 508. In some aspects, the UE RF sensing component 199 may generate communications and may transmit the generated communications to the transmission component 506 for transmission to the apparatus 508. In some aspects, the transmission component 506 may perform signal processing on the generated communications (such as filtering, amplification, modulation, digital-to-analog conversion, multiplexing, interleaving, mapping, or encoding, among other examples), and may transmit the processed signals to the apparatus 508. In other aspects, the transmission component 506 may include one or more antennas, a modulator, a transmit MIMO processor, a transmit processor, a controller/processor, a memory, or a combination thereof, of the UE 104 described above in connection with FIGS. 1, 3, and 4A-4B. In some aspects, the transmission component 506 may be co-located with the reception component 502 in a transceiver or transceiver component.

The UE RF sensing component 199 may be configured to perform sidelink-aided RF sensing. In some aspects, the UE RF sensing component 199 may include a set of components, such as a receiving component 510 configured to receive a sensing establishment message associated with a sensing session, one or more sensing measurement information, and/or a first sensing outcome information corresponding to the sensing session, and a transmitting component 515 configured to transmit the one or more sensing measurement information or a second sensing outcome information corresponding to the sensing session.

In other optional or additional aspects, the UE RF sensing component 199 may further include an identifying component configured to identify a sensing session configuration based on the sensing establishment message, and a generating component configured to generate an updated sensing session configuration.

Alternatively or additionally, the set of components may be separate and distinct from the UE RF sensing component 199. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1, 3, and 4A-4B. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of (one or more) components shown in FIG. 5 may perform one or more functions described as being performed by another set of components shown in FIGS. 1, 3, and 4A-4B.

Figure 6:
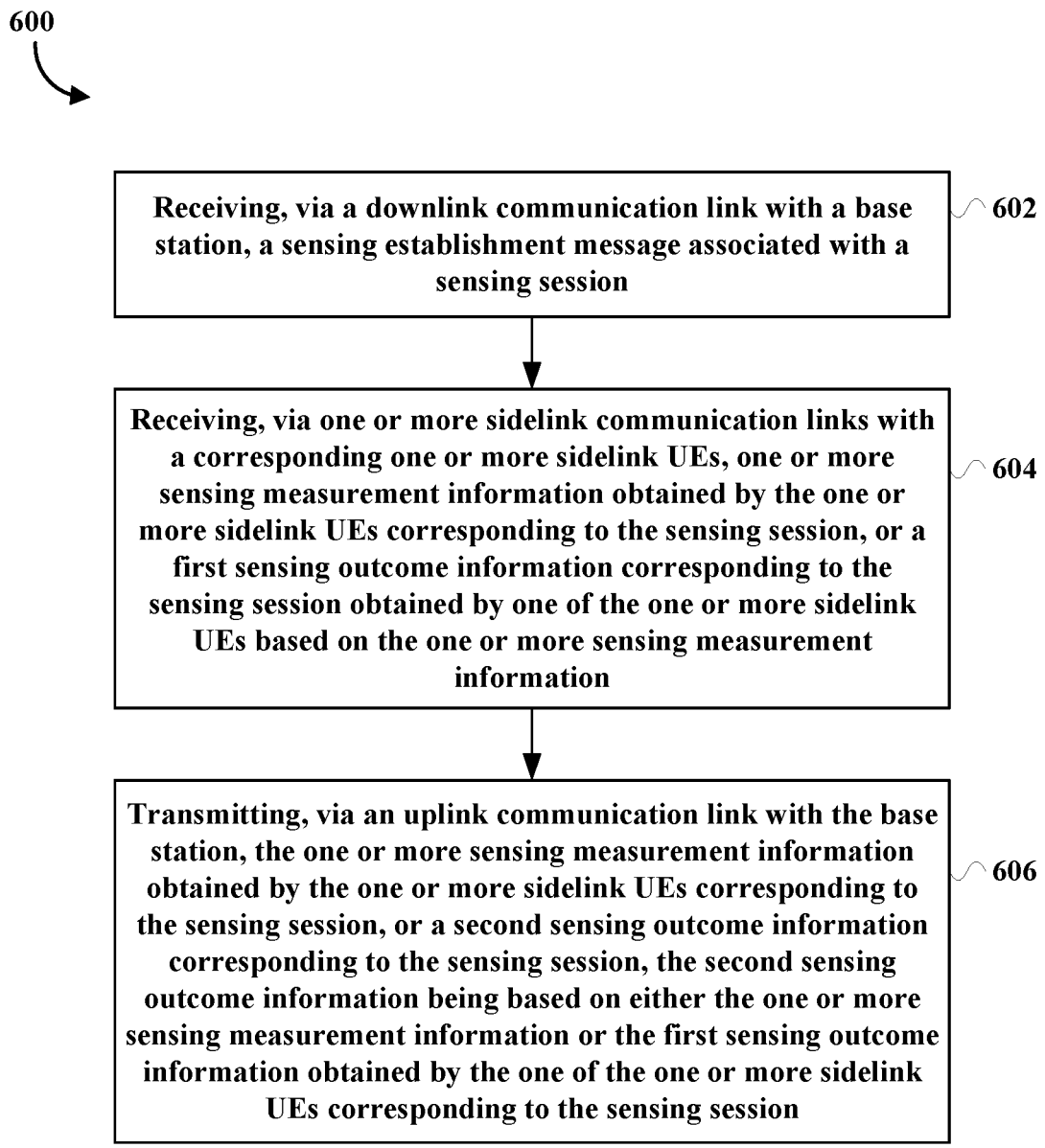
FIG. 6 is a flowchart of a method of sidelink-aided RF sensing at a UE, in accordance with various aspects of the present disclosure.

Referring to FIGS. 6-8, in operation, a UE 104 may perform a method 600 of sidelink-aided RF sensing. The method 600 may be performed by the UE 104 (which may include the memory 357 and which may be the entire UE 104 and/or one or more components of the UE 104 such as the UE RF sensing component 199, the TX processor 356, the RX processor 353, and/or the controller/processor 355). The method 600 may be performed by the UE RF sensing component 199 in communication with the base station 102.

At block 602 of FIG. 6, the method 600 includes receiving, via a downlink communication link with a base station, a sensing establishment message associated with a sensing session. For example, in an aspect, the UE 104, the UE RF sensing component 199, and/or the receiving component 510 may be configured to or may comprise means for receiving, via the downlink communication link 410 with the base station 102, a sensing establishment message associated with a sensing session.

For example, the receiving at block 602 may include receiving, via the downlink communication link 410 with the base station 102, the sensing establishment message associated with the sensing session. The sensing establishment message may comprise a sensing session configuration comprising a set of sensing session parameters used for performing the sensing session. The set of sensing session parameters may comprise at least one of an operating frequency band, indications of being configured as a transmitting entity and a receiving entity for the UE 104 and each of the one or more sidelink UEs 104 (e.g., a node partition configuration as described above in reference to FIG. 4A), sensing occasion information, a frequency bandwidth, a beam pattern, transmit power information, and a repetition pattern.

In some aspects, the sensing establishment message may indicate criteria for initiating the sensing session. That is, the sensing establishment message may indicate one or more conditions that are to be met to initiate the sensing session. For example, the sensing establishment message may indicate opportunistic criteria, deterministic criteria, and/or a combination thereof, as described above in reference to FIG. 4A.

Further, for example, the receiving at block 602 may be performed to configure an RF sensing session to be performed by one or more UEs 104 in communication with each other via sidelink communication links 440 and to report the results to the base station 102. Thus, the base station may offload the RF sensing data collection and/or analysis operations to the RF sensing nodes (e.g., UEs), which may reduce a processing load of the base station. Further, the aspects presented herein may improve RF sensing accuracy if or when the objects and/or targets being sensed are located closer in range to the RF sensing nodes (e.g., UEs) than to the network device (e.g., gNB, base station), and thus may result in an improved RF sensing accuracy when compared to conventional RF sensing procedures that may rely on the network device to perform the RF sensing.

At block 604 of FIG. 6, the method 600 includes receiving, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information. For example, in an aspect, the UE 104, the UE RF sensing component 199, and/or the receiving component 510 may be configured to or may comprise means for receiving, via the one or more sidelink communication links with the corresponding one or more sidelink UEs, the one or more sensing measurement information obtained by the one or more sidelink UEs corresponding to the sensing session, or the first sensing outcome information corresponding to the sensing session obtained by the one of the one or more sidelink UEs based on the one or more sensing measurement information.

For example, the receiving at block 604 may include initiating the sensing session according to criteria indicated by the sensing establishment message. The sensing establishment message may indicate opportunistic criteria, deterministic criteria, or a combination thereof, as described above in reference to FIG. 4A.

In some aspects, the UE and the one or more sidelink UEs may be configured to perform the sensing session according to the sensing session configuration in response to a determination that the opportunistic criteria and/or deterministic criteria for initiating the sensing session have been met, as described above in reference to FIG. 4A. For example, a portion of the UEs 104 (e.g., transmitting entities) participating in the sensing session may transmit an RF sensing signal (e.g., 430A) and another portion of the UEs 104 (e.g., receiving entities) may receive a reflected RF sensing signal (e.g., 430B-C). Alternatively or additionally, the receiving entities may perform one or more measurements on the reflected RF sensing signals, as described above in reference to FIG. 4A.

In other optional or additional aspects, the receiving at block 604 may include receiving from the one or more sidelink UEs, via one or more sidelink communication links, measurement data corresponding to the sensing session.

In other optional or additional aspects, the receiving at block 604 may include receiving raw measurement data corresponding to the sensing session in a time-domain format or a frequency-domain format, or a compressed representation of the raw measurement data. That is, the raw measurement data may be in a time-domain format (e.g., power levels as a function of time) or in a frequency-domain format (e.g., power levels as a function of frequency). Alternatively or additionally, the measurement data may comprise a compressed representation of the raw measurement data.

In other optional or additional aspects, the measurement data may comprise sensing outcome information determined by the sidelink UE based at least on the measurement data corresponding to the sidelink UE. The sensing outcome information may indicate a likelihood of whether one or more objects (e.g., targets) were detected at one or more locations.

In other optional or additional aspects, the operating frequency band of the communication link 410 with the base station 102 is different than the operating frequency band of the one or more sidelink communication links 440 with the corresponding one or more sidelink UEs 104.

Further, for example, the receiving at block 604 may be performed to collect the measurement results generated by the UEs participating in the RF sensing session at a single device that may have been designated to report the measurement results to the network device (e.g., gNB, base station). Thus, aspects presented herein may reduce overall network data traffic and may require only one active communication link between the UEs participating in the RF sensing session and the network device.

At block 606 of FIG. 6, the method 600 includes transmitting, via an uplink communication link with the base station, the one or more sensing measurement information obtained by the one or more sidelink UEs corresponding to the sensing session, or a second sensing outcome information corresponding to the sensing session, the second sensing outcome information being based on either the one or more sensing measurement information or the first sensing outcome information obtained by the one of the one or more sidelink UEs corresponding to the sensing session. For example, in an aspect, the UE 104, the UE RF sensing component 199, and/or the transmitting component 515 may be configured to or may comprise means for transmitting, via an uplink communication link 410 with the base station 102, the one or more sensing measurement information obtained by the one or more sidelink UEs 104 corresponding to the sensing session, or a second sensing outcome information corresponding to the sensing session, the second sensing outcome information being based on either the one or more sensing measurement information or the first sensing outcome information obtained by the one of the one or more sidelink UEs 104 corresponding to the sensing session.

For example, the transmitting at block 606 may include transmitting to the base station 102 the measurement data collected from the one or more sidelink UEs 104 at block 604. The measurement data may comprise raw measurements from the one or more sidelink UEs 104 corresponding to the sensing session. Alternatively or additionally, the measurement data may comprise the sensing outcome information of the one or more sidelink UEs 104 corresponding to the sensing session.

In some aspects, the transmitting at block 606 may include computing a second sensing outcome information based on the sensing outcome information of the one or more sidelink UEs 104 corresponding to the sensing session, and transmitting the second sensing outcome information to the base station 102 via the communication link 410.

In other optional or additional aspects, the transmitting at block 606 may include determining whether a confidence level of the sensing outcome information satisfies a confidence threshold, and transmitting the sensing outcome information in response to determining that a confidence level of the sensing outcome information satisfies the confidence threshold. For example, the UE 104 may report the sensing outcome information if or when the confidence level of the sensing outcome information satisfies the confidence threshold. Alternatively or additionally, the UE 104 may refrain from reporting the sensing outcome information if or when the confidence level of the sensing outcome information does not satisfy the confidence threshold.

In other optional or additional aspects, the transmitting at block 606 may include transmitting supplemental measurement information associated with the one or more sensing measurement information. The supplemental measurement information may comprise at least one of a geographical position information of the corresponding one or more sidelink UEs and an internal clock value of the corresponding one or more sidelink UEs.

Further, for example, the transmitting at block 606 may be performed to report to the network device (e.g., gNB, base station) the measurement data corresponding to the RF sensing session.

Referring to FIG. 7, in an optional or additional aspect that may be combined with any other aspect, at block 702, the method 600 may further include identifying a sensing session configuration based on the sensing establishment message, the sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern. For example, in an aspect, the UE 104, the UE RF sensing component 199, and/or the identifying component 520 may be configured to or may comprise means for identifying the sensing session configuration based on the sensing establishment message, the sensing session configuration comprising the set of sensing session parameters used for performing the sensing session, the set of sensing session parameters comprising the at least one of the operating frequency band, the indications of being configured as the transmitting entity and the receiving entity for the UE 104 and each of the one or more sidelink UEs 104, the sensing occasion information, the frequency bandwidth, the beam pattern, the transmit power information, the repetition pattern.

For example, the identifying at block 702 may include identifying a set of proposed sensing session parameters for the sensing session. The set of proposed sensing session parameters may comprise at least one of an operating frequency band, the node partition configuration, sensing occasion information, a frequency bandwidth, a beam pattern, transmit power information, and a repetition pattern.

In some aspects, the identifying at block 702 may include transmitting, via the uplink communication link 410 with the base station 102, the set of proposed sensing session parameters. In response to transmitting the set of proposed sensing session parameters, the identifying at block 702 may include receiving, via the downlink communication link 410 with the base station 102, the set of sensing session parameters based on the set of proposed sensing session parameters. That is, the UE 104 may receive a set of sensing session parameters that have been approved by the base station 102, as described above in reference to FIG. 4A.

In other optional or additional aspects, the identifying at block 702 may include receiving, via the downlink communication link 410 with the base station 102, a node partition configuration. Alternatively or additionally, the identifying at block 702 may include determining the node partition configuration based on a communication exchange, via the one or more sidelink communication links 440, between the UE 104 and the one or more sidelink UEs 104, as described above in reference to FIG. 4A.

Further, for example, the identifying at block 702 may be performed to configure an RF sensing session to be performed by one or more UEs 104 in communication with each other via sidelink communication links 440 and to report the results to the base station 102. Thus, the base station may offload the RF sensing data collection and/or analysis operations to the RF sensing nodes (e.g., UEs), which may reduce a processing load of the base station. Further, the aspects presented herein may improve RF sensing accuracy if or when the objects and/or targets being sensed are located closer in range to the RF sensing nodes (e.g., UEs) than to the network device (e.g., gNB, base station), and thus may result in an improved RF sensing accuracy when compared to conventional RF sensing procedures that may rely on the network device to perform the RF sensing In this optional or additional aspect, at block 704, the transmitting at block 606 of method 600 may further include transmitting, via the one or more sidelink communication links, the sensing session configuration to the one or more sidelink UEs. For example, in an aspect, the UE 104, the UE RF sensing component 199, and/or the transmitting component 515 may be configured to or may comprise means for transmitting, via the one or more sidelink communication links, the sensing session configuration to the one or more sidelink UEs 104.

For example, the transmitting at block 704 may include transmitting an indication of being configured as the transmitting entity or the receiving entity to each of the one or more sidelink UEs 104. That is, the transmitting at block 704 may include transmitting the node partition configuration to the one or more sidelink UEs 104 via the one or more sidelink communication links 440.

Further, for example, the transmitting at block 704 may be performed to configure the one or more sidelink UEs to perform the RF sensing session as indicated by the base station 102.

Referring to FIG. 8, in an optional or additional aspect that may be combined with any other aspect, at block 802, the method 600 may further include generating an updated sensing session configuration in response to a determination based on the one or more sensing measurement information or the second sensing outcome information corresponding to the sensing session, wherein the updated sensing session configuration indicates to: add a first sidelink UE to the one or more sidelink UEs for participation in a subsequent sensing session; or remove a second sidelink UE from the one or more sidelink UEs for participation in the subsequent sensing session. For example, in an aspect, the UE 104, the UE RF sensing component 199, and/or the generating component 525 may be configured to or may comprise means for generating an updated sensing session configuration in response to a determination based on the one or more sensing measurement information or the second sensing outcome information corresponding to the sensing session, wherein the updated sensing session configuration indicates to: add a first sidelink UE to the one or more sidelink UEs for participation in a subsequent sensing session; or remove a second sidelink UE from the one or more sidelink UEs for participation in the subsequent sensing session.

For example, the generating at block 802 may include generating an updated sensing session configuration associated with a subsequent sensing session, as described above in reference to FIG. 4A.

In some aspects, the generating at block 802 may include receiving the updated sensing session configuration from the base station 102 via the communication link 410.

Further, for example, the generating at block 802 may be performed to adapt the set of UEs participating in the RF sensing session according to changes to the sidelink network topology and/or changes to the sidelink channel conditions. Thus, aspects presented herein may improve resource efficiency of the wireless communication system.

Figure 9:
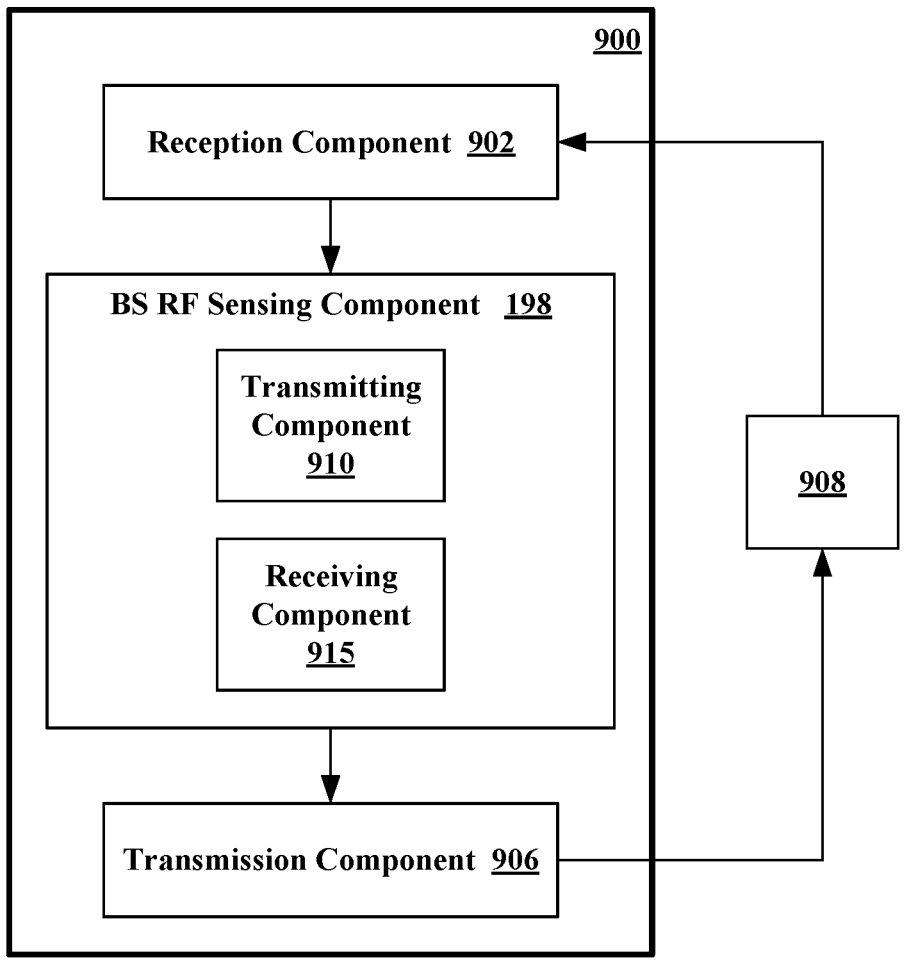
FIG. 9 is a diagram illustrating an example apparatus, such as a base station, for sidelink-aided RF sensing, in accordance with various aspects of the present disclosure.

FIG. 9 is a block diagram of an example apparatus 900 for wireless communication. The apparatus 900 may be a base station 102 (e.g., base station 102 of FIGS. 1, 3, and 4A-4B) or a base station 102 may include the apparatus 900. In some aspects, the apparatus 900 may include a reception component 902 configured to receive wireless communications from another apparatus (e.g., apparatus 908), a BS RF sensing component 198 configured to perform sidelink-aided RF sensing, a transmission component 906 configured to transmit wireless communications to another apparatus (e.g., apparatus 908), and which may be in communication with one another (e.g., via one or more buses or electrical connections). As shown, the apparatus 900 may be in communication with another apparatus 908 (such as a UE 104, or another wireless communication device) using the reception component 902 and the transmission component 906.

In some aspects, the apparatus 900 may be configured to perform one or more operations described herein in connection with FIGS. 1, 3, and 4A-4B. Alternatively or additionally, the apparatus 900 may be configured to perform one or more processes described herein, such as method 1000 of FIG. 10. In some aspects, the apparatus 900 may include one or more components of the base station 102 described above in connection with FIGS. 1, 3, and 4A-4B.

The reception component 902 may receive communications, such as reference signals, control information, data communications, or a combination thereof, from the apparatus 908. The reception component 902 may provide received communications to one or more other components of the apparatus 900, such as the BS RF sensing component 198. In some aspects, the reception component 902 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station 102 described above in connection with FIGS. 1, 3, and 4A-4B.

The transmission component 906 may transmit communications, such as reference signals, control information, data communications, or a combination thereof, to the apparatus 908. In some aspects, the BS RF sensing component 198 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In other aspects, the transmission component 906 may include one or more antennas, a modulator, a transmit MIMO processor, a transmit processor, a controller/processor, a memory, or a combination thereof, of the base station 102 described above in connection with FIGS. 1, 3, and 4A-4B. In some aspects, the transmission component 906 may be co-located with the reception component 902 in a transceiver or transceiver component.

The BS RF sensing component 198 may be configured to perform sidelink-aided RF sensing. In some aspects, the BS RF sensing component 198 may include a set of components, such as a transmitting component 910 configured to transmit a sensing establishment message associated with a sensing session, and a receiving component 915 configured to receive one or more sensing measurement information or sensing outcome information corresponding to the sensing session.

Alternatively or additionally, the set of components may be separate and distinct from the UE RF sensing component 199. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1, 3, and 4A-4B. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIGS. 1 and 3-6.

Figure 10:
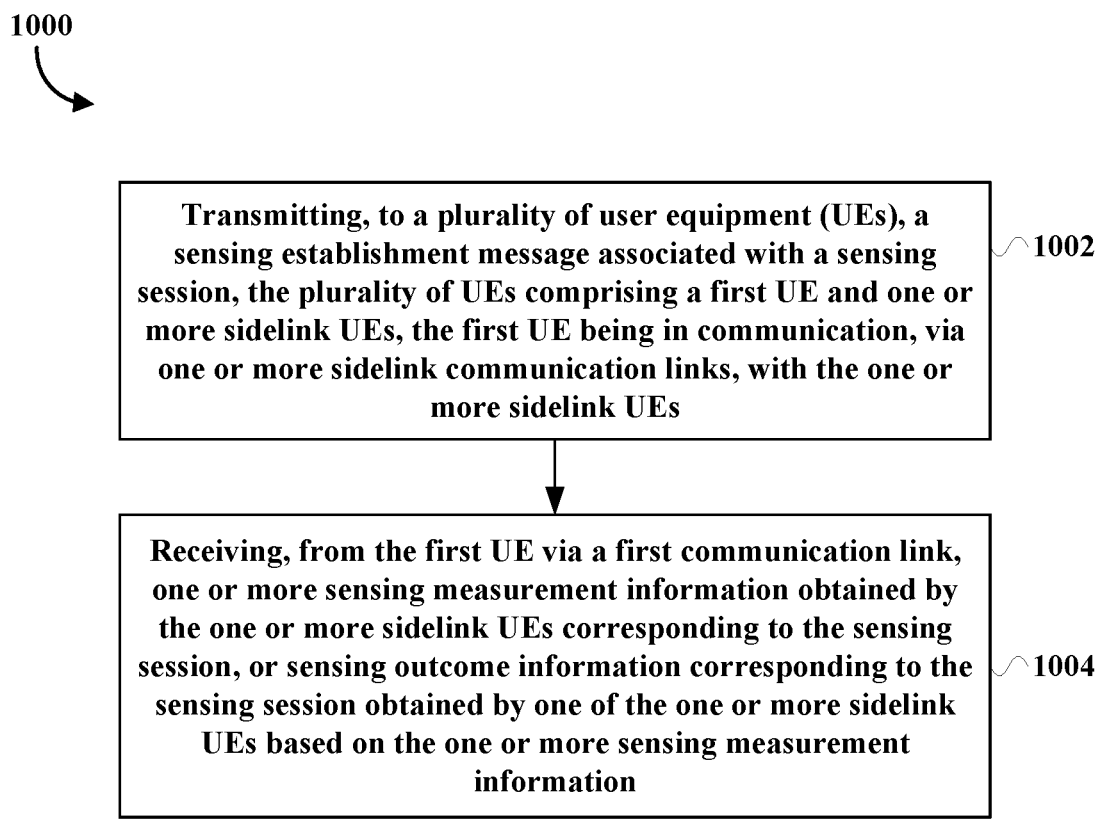
FIG. 10 is a flowchart of a method of sidelink-aided RF sensing at a base station, in accordance with various aspects of the present disclosure.

Referring to FIG. 10, in operation, a base station 102 may perform a method 1000 of sidelink-aided RF sensing. The method 1000 may be performed by the base station 102 (which may include the memory 317 and which may be the entire base station 102 and/or one or more components of the base station 102 such as the BS RF sensing component 198, the TX processor 316, the RX processor 313, and/or the controller/processor 315). The method 1000 may be performed by the BS RF sensing component 198 in communication with the UE 104.

At block 1002 of FIG. 10, the method 1000 includes transmitting, to a plurality of UEs, a sensing establishment message associated with a sensing session, the plurality of UEs comprising a first UE and one or more sidelink UEs, the first UE being in communication, via one or more sidelink communication links, with the one or more sidelink UEs. For example, in an aspect, the base station 102, the BS RF sensing component 198, and/or the transmitting component 910 may be configured to or may comprise means for transmitting, to the plurality of UEs, the sensing establishment message associated with the sensing session, the plurality of UEs 104 comprising the first UE 104 and the one or more sidelink UEs 104, the first UE 104 being in communication, via the one or more sidelink communication links, with the one or more sidelink UEs 104.

For example, the transmitting at block 1002 may include transmitting the sensing establishment message associated with the sensing session. The sensing establishment message may comprise a sensing session configuration comprising a set of sensing session parameters used for performing the sensing session. The set of sensing session parameters may comprise at least one of an operating frequency band, indications of being configured as a transmitting entity and a receiving entity for the UE 104 and each of the one or more sidelink UEs 104 (e.g., a node partition configuration as described above in reference to FIG. 4A), sensing occasion information, a frequency bandwidth, a beam pattern, transmit power information, and a repetition pattern.

In some aspects, the sensing establishment message may indicate criteria for initiating the sensing session. That is, the sensing establishment message may indicate one or more conditions that are to be met to initiate the sensing session.

For example, the sensing establishment message may indicate opportunistic criteria, deterministic criteria, and/or a combination thereof, as described above in reference to FIG. 4A.

Further, for example, the transmitting at block 1002 may be performed to configure an RF sensing session to be performed by one or more UEs 104 in communication with each other via sidelink communication links 440 and to report the results to the base station 102. Thus, the base station may offload the RF sensing data collection and/or analysis operations to the RF sensing nodes (e.g., UEs), which may reduce a processing load of the base station. Further, the aspects presented herein may improve RF sensing accuracy if or when the objects and/or targets being sensed are located closer in range to the RF sensing nodes (e.g., UEs) than to the network device (e.g., gNB, base station), and thus may result in an improved RF sensing accuracy when compared to conventional RF sensing procedures that may rely on the network device to perform the RF sensing.

At block 1004 of FIG. 10, the method 1000 includes receiving, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information. For example, in an aspect, the base station 102, the BS RF sensing component 198, and/or the receiving component 915 may be configured to or may comprise means for receiving, from the first UE 104 via a first communication link, one or more sensing measurement information obtained by the one or more sidelink UEs corresponding to the sensing session, or sensing outcome information corresponding to the sensing session obtained by one of the one or more sidelink UEs 104 based on the one or more sensing measurement information.

For example, the receiving at block 1004 may include receiving the measurement data collected from the one or more sidelink UEs 104. The measurement data may comprise raw measurements from the one or more sidelink UEs 104 corresponding to the sensing session. Alternatively or additionally, the measurement data may comprise the sensing outcome information of the one or more sidelink UEs 104 corresponding to the sensing session.

In other optional or additional aspects, the receiving at block 1004 may include receiving supplemental measurement information associated with the one or more sensing measurement information. The supplemental measurement information may comprise at least one of a geographical position information of the corresponding one or more sidelink UEs and an internal clock value of the corresponding one or more sidelink UEs.

Further, for example, the receiving at block 1004 may be performed to report to the network device (e.g., gNB, base station) the measurement data corresponding to the RF sensing session.

Implementation examples are described in the following numbered clauses

1. A method of sidelink-aided radio frequency (RF) sensing at a user equipment (UE) of a wireless communication network, comprising:
   receiving, via a downlink communication link with a base station, a sensing establishment message associated with a sensing session;
   receiving, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information; and
   transmitting, via an uplink communication link with the base station, the one or more sensing measurement information obtained by the one or more sidelink UEs corresponding to the sensing session, or a second sensing outcome information corresponding to the sensing session, the second sensing outcome information being based on either the one or more sensing measurement information or the first sensing outcome information obtained by the one of the one or more sidelink UEs corresponding to the sensing session.

2. The method of any preceding clause, further comprising:
   identifying a sensing session configuration based on the sensing establishment message, the sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern; and
   transmitting, via the one or more sidelink communication links, the sensing session configuration to the one or more sidelink UEs.

3. The method of any preceding clause, wherein identifying the sensing session configuration comprises:
   transmitting, via the uplink communication link with the base station, a set of proposed sensing session parameters; and
   receiving, via the downlink communication link with the base station, the set of sensing session parameters based on the set of proposed sensing session parameters.

4 The method of any preceding clause, wherein transmitting the one or more sensing measurement information comprises:
   transmitting supplemental measurement information associated with the one or more sensing measurement information, the supplemental measurement information comprising at least one of a geographical position information of the corresponding one or more sidelink UEs and an internal clock value of the corresponding one or more sidelink UEs.

5. The method of any preceding clause, wherein receiving the one or more sensing measurement information comprises:
   receiving raw measurement data corresponding to the sensing session in a time-domain format or a frequency-domain format, or a compressed representation of the raw measurement data.

6. The method of any preceding clause, further comprising:
   computing the second sensing outcome information based on the one or more sensing measurement information.

7. The method of any preceding clause, wherein transmitting the second sensing outcome information comprises:

determining whether a confidence level of the second sensing outcome information satisfies a confidence threshold; and wherein transmitting the second sensing outcome information is in response to determining that the confidence level satisfies the confidence threshold.

8. The method of any preceding clause, further comprising:

receiving, via the downlink communication link with the base station, a node partition configuration indicating whether the UE and each sidelink UE of the one or more sidelink UEs is configured as a transmitting entity or a receiving entity during the sensing session; and wherein transmitting the sensing session configuration to the one or more sidelink UEs includes transmitting an indication of being configured as the transmitting entity or the receiving entity to each of the one or more sidelink UEs.

9. The method of any preceding clause, further comprising:

determining a node partition configuration for the UE and the one or more sidelink UEs based on a communication exchange, via the one or more sidelink communication links, between the UE and the one or more sidelink UEs, the node partition configuration indicating whether the UE and each sidelink UE of the one or more sidelink UEs is respectively configured as a transmitting entity or a receiving entity during the sensing session.

10. The method of any preceding clause, further comprising:

initiating the sensing session in response to determining that opportunistic criteria have been met, the opportunistic criteria having been indicated by the sensing establishment message and comprising at least one of sidelink network topology conditions, UE-specific conditions, and RF quality conditions, that are to be met to initiate the sensing session.

11. The method of any preceding clause, further comprising:

initiating the sensing session in response to determining that deterministic criteria have been met, the deterministic criteria having been indicated by the sensing establishment message and indicating one or more time occasions at which the sensing session is to be initiated.

12. The method of any preceding clause, wherein receiving the sensing establishment message comprises:

receiving, via the downlink communication link with the base station, the sensing establishment message associated with the sensing session, the sensing establishment message comprising a sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern.

13. The method of any preceding clause, wherein a first operating frequency band of the downlink communication link and/or the uplink communication link with the base station is different than a second operating frequency band of the one or more sidelink communication links with the corresponding one or more sidelink UEs.

14. The method of any preceding clause, further comprising:

receiving or generating an updated sensing session configuration in response to a determination based on the one or more sensing measurement information or the second sensing outcome information corresponding to the sensing session, wherein the updated sensing session configuration indicates to:

add a first sidelink UE to the one or more sidelink UEs for participation in a subsequent sensing session; or remove a second sidelink UE from the one or more sidelink UEs for participation in the subsequent sensing session.

15. An apparatus of sidelink-aided RF sensing at a UE of a wireless communication network, comprising a memory, and a processor communicatively coupled with the memory and configured to perform one or more of the methods of any of the clauses 1-14.

16. An apparatus of sidelink-aided RF sensing at a UE of a wireless communication network, comprising means for performing one or more of the methods of any of the clauses 1-14.

17. A computer-readable medium storing instructions of sidelink-aided RF sensing at a UE of a wireless communication network, executable by a processor, to perform one or more of the methods of any of the clauses 1-14.

18. A method of sidelink-aided RF sensing at a base station of a wireless communication network, comprising:

transmitting, to a plurality of UEs, a sensing establishment message associated with a sensing session, the plurality of UEs comprising a first UE and one or more sidelink UEs, the first UE being in communication, via one or more sidelink communication links, with the one or more sidelink UEs; and receiving, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

19. An apparatus of sidelink-aided RF sensing at a base station of a wireless communication network, comprising:

a memory; and a processor communicatively coupled with the memory and configured to:

transmit, to a plurality of UEs, a sensing establishment message associated with a sensing session, the plurality of UEs comprising a first UE and one or more sidelink UEs, the first UE being in communication, via one or more sidelink communication links, with the one or more sidelink UEs; and receive, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

20. An apparatus of sidelink-aided RF sensing at a base station of a wireless communication network, comprising:

means for transmitting, to a plurality of UEs, a sensing establishment message associated with a sensing session, the plurality of UEs comprising a first UE and one or more sidelink UEs, the first UE being in communication, via one or more sidelink communication links, with the one or more sidelink UEs; and means for receiving, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

21. A computer-readable medium storing instructions of sidelink-aided RF sensing at a base station of a wireless communication network, executable by a processor, to:

transmit, to a plurality of UEs, a sensing establishment message associated with a sensing session, the plurality of UEs comprising a first UE and one or more sidelink UEs, the first UE being in communication, via one or more sidelink communication links, with the one or more sidelink UEs; and receive, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of sidelink-aided radio frequency (RF) sensing at a user equipment (UE) of a wireless communication network, comprising:

receiving, via a downlink communication link with a base station, a sensing establishment message associated with a sensing session;

receiving, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information; and transmitting, via an uplink communication link with the base station, the one or more sensing measurement information obtained by the one or more sidelink UEs corresponding to the sensing session, or a second sensing outcome information corresponding to the sensing session, the second sensing outcome information being based on either the one or more sensing measurement information or the first sensing outcome information obtained by the one of the one or more sidelink UEs corresponding to the sensing session.

2. The method of claim 1, further comprising:

identifying a sensing session configuration based on the sensing establishment message, the sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern; and transmitting, via the one or more sidelink communication links, the sensing session configuration to the one or more sidelink UEs.

3. The method of claim 2, wherein identifying the sensing session configuration comprises:
transmitting, via the uplink communication link with the base station, a set of proposed sensing session parameters; and
receiving, via the downlink communication link with the base station, the set of sensing session parameters based on the set of proposed sensing session parameters.

4. The method of claim 2, wherein transmitting the one or more sensing measurement information comprises:
transmitting supplemental measurement information associated with the one or more sensing measurement information, the supplemental measurement information comprising at least one of a geographical position information of the corresponding one or more sidelink UEs and an internal clock value of the corresponding one or more sidelink UEs.

5. The method of claim 2, wherein receiving the one or more sensing measurement information comprises:
receiving raw measurement data corresponding to the sensing session in a time-domain format or a frequency-domain format, or a compressed representation of the raw measurement data.

6. The method of claim 2, further comprising:
computing the second sensing outcome information based on the one or more sensing measurement information.

7. The method of claim 2, wherein transmitting the second sensing outcome information comprises:
determining whether a confidence level of the second sensing outcome information satisfies a confidence threshold; and
wherein transmitting the second sensing outcome information is in response to determining that the confidence level satisfies the confidence threshold.

8. The method of claim 2, further comprising:
receiving, via the downlink communication link with the base station, a node partition configuration indicating whether the UE and each sidelink UE of the one or more sidelink UEs is configured as a transmitting entity or a receiving entity during the sensing session; and
wherein transmitting the sensing session configuration to the one or more sidelink UEs includes transmitting an indication of being configured as the transmitting entity or the receiving entity to each of the one or more sidelink UEs.

9. The method of claim 2, further comprising:
determining a node partition configuration for the UE and the one or more sidelink UEs based on a communication exchange, via the one or more sidelink communication links, between the UE and the one or more sidelink UEs, the node partition configuration indicating whether the UE and each sidelink UE of the one or more sidelink UEs is respectively configured as a transmitting entity or a receiving entity during the sensing session.

10. The method of claim 2, further comprising:
initiating the sensing session in response to determining that opportunistic criteria have been met, the opportunistic criteria having been indicated by the sensing establishment message and comprising at least one of sidelink network topology conditions, UE-specific conditions, and RF quality conditions, that are to be met to initiate the sensing session.

11. The method of claim 2, further comprising:
initiating the sensing session in response to determining that deterministic criteria have been met, the deterministic criteria having been indicated by the sensing establishment message and indicating one or more time occasions at which the sensing session is to be initiated.

12. The method of claim 1, wherein receiving the sensing establishment message comprises:
receiving, via the downlink communication link with the base station, the sensing establishment message associated with the sensing session, the sensing establishment message comprising a sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern.

13. The method of claim 12, wherein a first operating frequency band of the downlink communication link and/or the uplink communication link with the base station is different than a second operating frequency band of the one or more sidelink communication links with the corresponding one or more sidelink UEs.

14. The method of claim 1, further comprising:
receiving or generating an updated sensing session configuration in response to a determination based on the one or more sensing measurement information or the second sensing outcome information corresponding to the sensing session, wherein the updated sensing session configuration indicates to:
add a first sidelink UE to the one or more sidelink UEs for participation in a subsequent sensing session; or
remove a second sidelink UE from the one or more sidelink UEs for participation in the subsequent sensing session.

15. An apparatus of sidelink-aided radio frequency (RF) sensing at a user equipment (UE) of a wireless communication network, comprising:
a memory; and
a processor communicatively coupled with the memory and configured to:
receive, via a downlink communication link with a base station, a sensing establishment message associated with a sensing session;
receive, via one or more sidelink communication links with a corresponding one or more sidelink UEs, one or more sensing measurement information obtained by the one or more sidelink UEs corresponding to the sensing session, or a first sensing outcome information corresponding to the sensing session obtained by one of the one or more sidelink UEs based on the one or more sensing measurement information; and
transmit, via an uplink communication link with the base station, the one or more sensing measurement information obtained by the one or more sidelink UEs corresponding to the sensing session, or a second sensing outcome information corresponding to the sensing session, the second sensing outcome information being based on either the one or more sensing measurement information or the first sensing outcome information obtained by the one of the one or more sidelink UEs corresponding to the sensing session.

16. The apparatus of claim 15, wherein the processor is further configured to:
 identify a sensing session configuration based on the sensing establishment message, the sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern; and
 transmit, via the one or more sidelink communication links, the sensing session configuration to the one or more sidelink UEs.

17. The apparatus of claim 16, wherein to identify the sensing session configuration comprises:
 transmitting, via the uplink communication link with the base station, a set of proposed sensing session parameters; and
 receiving, via the downlink communication link with the base station, the set of sensing session parameters based on the set of proposed sensing session parameters.

18. The apparatus of claim 16, wherein to transmit the one or more sensing measurement information comprises:
 transmitting supplemental measurement information associated with the one or more sensing measurement information, the supplemental measurement information comprising at least one of a geographical position information of the corresponding one or more sidelink UEs and an internal clock value of the corresponding one or more sidelink UEs.

19. The apparatus of claim 16, wherein to receive the one or more sensing measurement information comprises:
 receiving raw measurement data corresponding to the sensing session in a time-domain format or a frequency-domain format, or a compressed representation of the raw measurement data.

20. The apparatus of claim 16, wherein the processor is further configured to:
 compute the second sensing outcome information based on the one or more sensing measurement information.

21. The apparatus of claim 16, wherein to transmit the second sensing outcome information comprises:
 determining whether a confidence level of the second sensing outcome information satisfies a confidence threshold; and
 wherein to transmit the second sensing outcome information is in response to determining that the confidence level satisfies the confidence threshold.

22. The apparatus of claim 16, wherein the processor is further configured to:
 receive, via the downlink communication link with the base station, a node partition configuration indicating whether the UE and each sidelink UE of the one or more sidelink UEs is configured as a transmitting entity or a receiving entity during the sensing session; and
 wherein transmitting the sensing session configuration to the one or more sidelink UEs includes transmitting an indication of being configured as the transmitting entity or the receiving entity to each of the one or more sidelink UEs.

23. The apparatus of claim 16, wherein the processor is further configured to:
 determine a node partition configuration for the UE and the one or more sidelink UEs based on a communication exchange, via the one or more sidelink communication links, between the UE and the one or more sidelink UEs, the node partition configuration indicating whether the UE and each sidelink UE of the one or more sidelink UEs is respectively configured as a transmitting entity or a receiving entity during the sensing session.

24. The apparatus of claim 16, wherein the processor is further configured to:
 initiate the sensing session, in response to determining that opportunistic criteria have been met, the opportunistic criteria having been indicated by the sensing establishment message and comprising at least one of sidelink network topology conditions, UE-specific conditions, and RF quality conditions, that are to be met to initiate the sensing session.

25. The apparatus of claim 16, wherein the processor is further configured to:
 initiate the sensing session, in response to determining that deterministic criteria have been met, the deterministic criteria having been indicated by the sensing establishment message and indicating one or more time occasions at which the sensing session is to be initiated.

26. The apparatus of claim 15, wherein to receive the sensing establishment message comprises:
 receiving, via the downlink communication link with the base station, the sensing establishment message associated with the sensing session, the sensing establishment message comprising a sensing session configuration comprising a set of sensing session parameters used for performing the sensing session, the set of sensing session parameters comprising at least one of an operating frequency band, indications of being configured as a transmitting entity and a receiving entity for the UE and each of the one or more sidelink UEs, sensing occasion information, a frequency bandwidth, a beam pattern, transmit power information, a repetition pattern.

27. The apparatus of claim 26, wherein a first operating frequency band of the downlink communication link and/or the uplink communication link with the base station is different than a second operating frequency band of the one or more sidelink communication links with the corresponding one or more sidelink UEs.

28. The apparatus of claim 26, wherein the processor is further configured to:
 receive or generate an updated sensing session configuration in response to a determination based on the one or more sensing measurement information or the second sensing outcome information corresponding to the sensing session, wherein the updated sensing session configuration indicates to:
 add a first sidelink UE to the one or more sidelink UEs for participation in a subsequent sensing session; or
 remove a second sidelink UE from the one or more sidelink UEs for participation in the subsequent sensing session.

29. A method of sidelink-aided radio frequency (RF) sensing at a base station of a wireless communication network, comprising:
 transmitting, to a plurality of user equipment (UEs), a sensing establishment message associated with a sensing session, the plurality of UEs comprising a first UE and one or more sidelink UEs, the first UE being in communication, via one or more sidelink communication links, with the one or more sidelink UEs; and receiving, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

30. An apparatus of sidelink-aided radio frequency (RF) sensing at a base station of a wireless communication network, comprising:

a memory; and a processor communicatively coupled with the memory and configured to:

transmit, to a plurality of user equipment (UEs), a sensing establishment message associated with a sensing session, the plurality of UEs comprising a first UE and one or more sidelink UEs, the first UE being in communication, via one or more sidelink communication links, with the one or more sidelink UEs; and receive, from the first UE via a first communication link, one or more sensing measurement information obtained by the one or more sidelink UEs corresponding to the sensing session, or sensing outcome information corresponding to the sensing session obtained by one of the one or more sidelink UEs based on the one or more sensing measurement information.

* * * * *